US010876609B2

(12) United States Patent
Rodi

(10) Patent No.: US 10,876,609 B2
(45) Date of Patent: Dec. 29, 2020

(54) CONTINUOUSLY-VARIABLE PLANETARY TRANSMISSION

(71) Applicant: Rolless GmbH, Achstetten (DE)

(72) Inventor: Wolfgang Rodi, Laupheim/Baustetten (DE)

(73) Assignee: Rolless GmbH, Achstetten (DE)

( * ) Notice: Subject to any disclaimer, the term of this patent is extended or adjusted under 35 U.S.C. 154(b) by 129 days.

(21) Appl. No.: 16/066,650

(22) PCT Filed: Dec. 20, 2016

(86) PCT No.: PCT/EP2016/081889
§ 371 (c)(1),
(2) Date: Jun. 27, 2018

(87) PCT Pub. No.: WO2017/114691
PCT Pub. Date: Jul. 6, 2017

(65) Prior Publication Data
US 2019/0003560 A1    Jan. 3, 2019

(30) Foreign Application Priority Data
Dec. 30, 2015 (EP) ...................... 15203052

(51) Int. Cl.
*B62M 11/12* (2006.01)
*F16H 15/50* (2006.01)
*B62M 11/16* (2006.01)

(52) U.S. Cl.
CPC ............ *F16H 15/50* (2013.01); *B62M 11/12* (2013.01); *B62M 11/16* (2013.01)

(58) Field of Classification Search
CPC ......... F16H 15/50; B62M 11/12; B62M 11/16
See application file for complete search history.

(56) References Cited

U.S. PATENT DOCUMENTS 2,359,540 A * 10/1944 Bade ...................... F16H 15/50
475/185
2,860,530 A    11/1958 Hine et al.
(Continued)

FOREIGN PATENT DOCUMENTS

CH       265617 A    12/1949
DE      8704197 U1    8/1987
(Continued)

*Primary Examiner* — David J Hlavka
(74) *Attorney, Agent, or Firm* — Jansson Munger McKinley & Kirby Ltd.

(57) ABSTRACT

A continuously-variable planetary transmission including: (a) first and second spaced rotatable transmission elements spaced around a transmission axis and having first and second contact points, respectively; (b) at least one support element in fixed radial position with respect to the transmission axis and each having a third contact point; and (c) at least one elongate, rotationally-symmetric, rotatable planetary rolling element, each rolling element (1) contacting the transmission elements at the first and second contact points and each support element at its third contact point, the contact points each in frictional rolling connection to the at least one rolling element and (2) being supported by the first and second transmission elements and the at least one support element with freedom to move around the transmission axis; and (d) an adjusting device for displacing the center of each planetary rolling element to change the ratio of the transmission.

17 Claims, 9 Drawing Sheets

(56) References Cited

U.S. PATENT DOCUMENTS

| | | | |
|---|---|---|---|
| 2,936,638 A | 5/1960 | Wassilieff | |
| 3,407,687 A | 10/1968 | Tadashi | |
| 4,152,946 A * | 5/1979 | Kemper | F01B 3/0023 |
| | | | 475/166 |
| 8,469,856 B2 * | 6/2013 | Thomassy | F16H 15/28 |
| | | | 476/40 |
| 9,005,068 B2 * | 4/2015 | Urabe | F16H 15/503 |
| | | | 475/193 |
| 2008/0261747 A1 | 10/2008 | Triller et al. | |
| 2011/0218072 A1 * | 9/2011 | Lohr | F16H 15/28 |
| | | | 475/185 |
| 2013/0324344 A1 * | 12/2013 | Pohl | F16H 15/50 |
| | | | 475/185 |

FOREIGN PATENT DOCUMENTS

| | | |
|---|---|---|
| EP | 0528381 A1 | 2/1993 |
| EP | 2397723 A1 | 12/2011 |
| JP | H02212651 A | 8/1990 |
| WO | 2008040281 A1 | 4/2008 |

\* cited by examiner

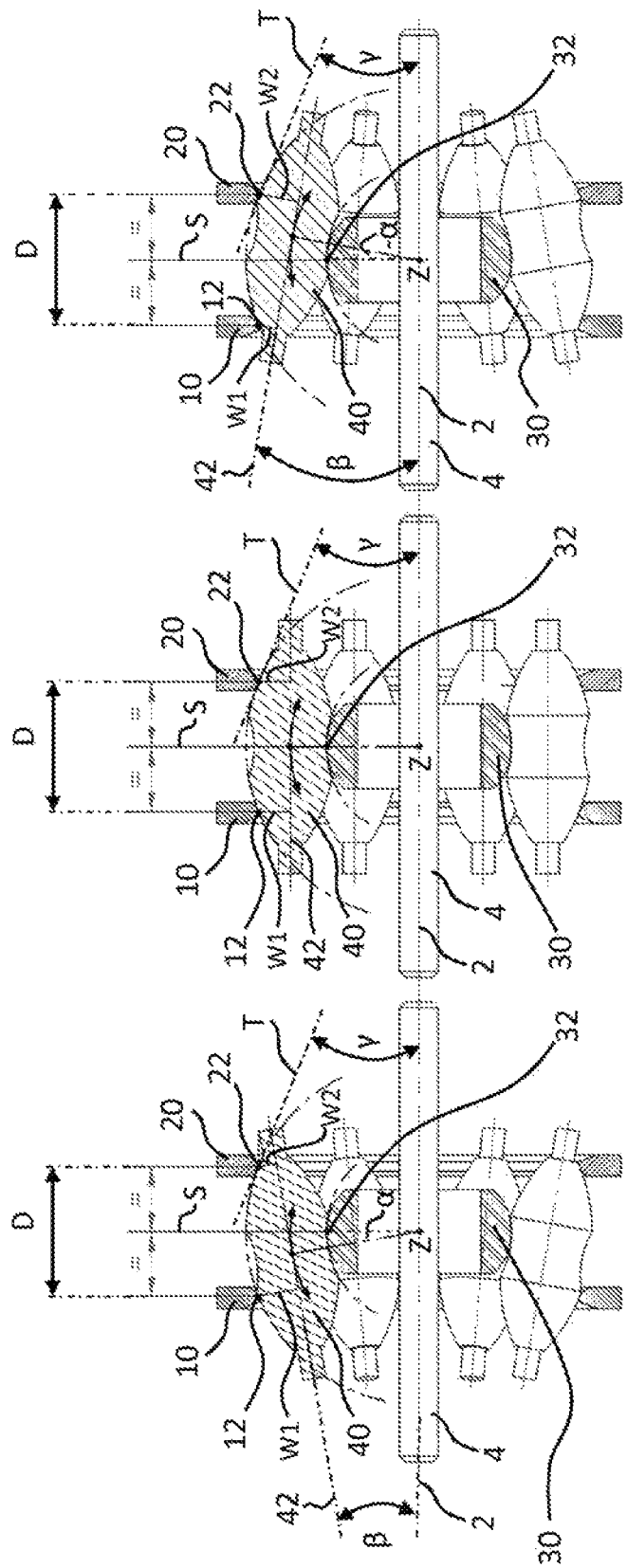

CONTINUOUSLY-VARIABLE PLANETARY TRANSMISSION

CROSS-REFERENCE TO RELATED APPLICATION

The present application is a U.S. national phase entry of pending International Patent Application No. PCT/EP2016/081889, international filing date Dec. 20, 2016, which claims priority to European Patent Application No. EP 15 203 052.4, filed Dec. 30, 2015, the contents of which are incorporated by reference in their entireties.

FIELD OF THE INVENTION

The present invention relates to a continuously-variable planetary transmission for machines and vehicles, especially for muscle-powered vehicles such as bicycles, pedelecs, and e-bikes.

BACKGROUND OF THE INVENTION

Known hub gears, which are usually configured as planetary transmissions, are being used more frequently in bicycles. In principle, a distinction can be made between transmissions which can be shifted in continuously-variable fashion (e.g., NuVinci CVP N360) and transmissions with straight or helical teeth and fixed gear ratios (e.g., Rohloff Speedhub, Shimano Alfine). The increasing number of pedelecs and e-bikes which are becoming available is also leading to new requirements on bicycle transmissions. In the case of conventional, positive-acting, derailleur and rear-wheel hub transmissions, a considerable amount of shifting noise can be heard, and there is the likelihood of increased wear and even damage to the transmission when these are shifted under load without disengaging the transmission elements.

In contrast to transmissions with fixed gear ratios, continuously-variable transmissions offer the advantage that they can be shifted very easily both under full load and when at rest; they are of simple construction; the rolling elements run quietly; and, in comparison to gear wheels, they generate very little if any vibration, and thus work almost silently. Hub transmissions, furthermore, require little maintenance and are hermetically sealed, which protects them in turn from dirt and external damage. Nevertheless, the overall range of ratios of the continuously-variable transmissions has been relatively limited thus far and is considerably smaller than that of transmissions with fixed speed ratios. The maximum achievable efficiency of the known continuously-variable transmissions is also much lower than that of fixed-ratio transmissions.

Continuously-variable planetary transmissions which are adapted in particular to use as bicycle hub transmissions are so-called friction-gear transmissions and usually consist of two ring-shaped transmission elements for transferring the input and output torque, several rotationally symmetric rolling elements, and a ring-shaped support element, which supports the rolling elements against the transmission elements. The torque produced by the user or by, for example, an electric motor, is usually introduced by a chain or a toothed belt and a sprocket to the first transmission element and passed on from the first transmission element via the rolling elements to the second transmission element, which is permanently connected to the hub housing. The transmission elements, the rolling elements, and the support element are usually arranged around a transmission axis and supported rotatably around it. The speed ratio in transmissions of this type is determined by the ratio of the effective radii of the rolling elements on the input and output side, wherein the effective radii are defined as the lines perpendicular to the rotational axis of the rolling elements extending between this axis and the contact point between the rolling elements and the associated transmission element.

Distinctions are made between various types of constructions of friction-gear transmissions which are adapted in particular to use as bicycle hub transmissions; these distinctions include those pertaining to the geometry of the rolling element employed. Up to now, the chief distinction has been between spherical and double-conical rolling elements. Another distinguishing criterion is the arrangement of the transmission elements and support elements, wherein, in some friction-gear transmissions, the transmission elements are arranged on the side of the rolling elements facing the transmission axis and the support element is arranged on the side of the rolling element facing away from the transmission axis. In other embodiments, the transmission elements are arranged on the side facing away from the transmission axis, and the support element is arranged on the side of the rolling elements facing the transmission axis.

The spin/roll ratio characterizes the extent to which the bore moves and thus the extent of the associated losses at the contact points between two rotating friction elements. The spin/roll ratios which occur between the rotating friction elements at the power transmission points of the rolling elements thus provide information on the efficiency of the transmission, wherein in principle small spin/roll ratios mean highly efficient power transmission and thus usually a high degree of efficiency. The spin/roll ratio is significantly affected by the angle of the rotational axes of the rotating rolling elements to each other and the angular position of the tangent to the contact point with the rotational axes. If the rotational axes of two rolling elements are parallel to each other and if the tangent to the contact point is also parallel to the rotational axes, the spin motion and thus the spin/roll ratio approach zero. The spin/roll ratio also approaches zero when the rotational axes of two rolling elements and the tangent to the contact point of the two rolling elements meet at a common point. Because, in the case of the above-cited conventional transmissions, the tangent does not change during a change in the transmission ratio, essentially the following is true: As the angle between the rotational axes increases, the relative movement between the rolling elements increases, and the spin/roll ratio also becomes larger. To determine the spin/roll ratio, reference can be made by way of example to the reference book "Dubbel: Taschenbuch für den Maschinenbau" [Dubbel—Handbook for Mechanical Engineering], Chapter 7 (21st edition, Springer Verlag, 2005).

Continuously-variable planetary transmissions in which the rolling elements are spherical are known from, for example, EP 0 528 381 A1 and EP 0 528 382 A1 of Fichtel & Sachs AG. Other continuously-variable planetary transmissions which use spherical rolling elements for bicycle hub transmissions are offered by Fallbrook Intellectual Property Company LLC under the name NuVinci. A hub shifting mechanism with a planetary transmission of this type is described in, for example, U.S. Pat. No. 8,641,572 B2.

To change or adjust the transmission ratio with these types of arrangements, the rotational axis of the spherical rolling elements is tilted around the center of gravity of the balls, so that the effective radii and thus the rotational speeds of the transmission elements on the drive side and on the take-off side are changed. Conventionally, the spherical rolling elements comprise for this purpose a shaft, which forms the rotational axis of the rolling elements. The balls are in frictional connection with two torque-transferring elements, one of which is configured as the transmission input and one as the transmission output. A support element supports the spherical rolling elements against the torque-transferring elements. The support element can be axially adjustable with respect to the transmission axis, wherein the axial displacement of the support element can be transmitted, firstly, directly to the spherical rolling elements or, secondly, via adjusting elements to the ends of the shafts. The axial displacement of the support element can thus bring about a tilting of the rotational axis around the center of gravity of the balls. Because of the contact angle between the torque-transferring elements and the spherical rolling elements, not only circumferential forces but also high axial forces develop, which are absorbed by the transmission housing.

In addition to continuously-variable planetary transmissions with purely spherical rolling elements, friction-gear or planetary transmissions are also known in which the rolling elements are essentially spherical but are also formed with a large circumferential recess in the middle. Thus, for example, DE 10 2008 058 074 A1 describes a planetary transmission in which a rolling element of this type is supported between a support element configured as a ring and two torque-transferring elements. The outer surfaces of the rolling element, by which it can be in contact with the torque-transferring elements, correspond essentially to two partial spherical surfaces of a ball; and, in the area of the circumferential recess, the rolling element is in contact with the support element. This rolling element also has a shaft, which forms the rotational axis of the rolling element, and around which it is rotatably supported by two roller bearings. The change of the transmission ratio occurs in this case by way of a shifting unit, which acts at least on an outer end of the shaft and tilts the rolling elements around an axis which passes through its center of gravity.

The "contact angle" is defined as the angle between the rotational axis of the transmission element and a tangent to the rolling element geometry through the contact point between the rolling element and the transmission element. Both in the case of ball-shaped and ball-like rolling elements, this contact angle has a relatively steep pitch. The force components oriented axially to the transmission axis for building up the necessary normal forces at the contact points are therefore quite large. Especially in the case of bicycle hub transmissions, the transmitted torques are high (up to 250 Nm), but the lever arms which are available are very small because of the amount of space available in a bicycle hub. Especially at the contact surfaces or contact points between the torque-transferring elements and the rolling elements, very high normal and contact forces therefore develop, which lead in turn to high Hertzian contact stresses at the contact surfaces. The high axial forces, firstly, must be absorbed by the transmission housing, so that this housing must be relatively massive, which means in turn that the transmission becomes heavier. Secondly, increased axial forces bring about greater frictional losses in the axial bearings between the torque-transferring element and the housing. In general, the contact angle resulting from the ball geometry therefore has a disadvantageous effect on the efficiency and the achievable transmission ratio of the planetary transmission. Another disadvantage of the planetary transmission according to DE 10 2008 058 074 A1 is that, depending on the change in the speed ratio, different speeds occur at the four contact points, and therefore slippage losses occur because of the lack of symmetry of the forces involved.

When a shift is made from a small to a large transmission ratio, furthermore, the spin/roll ratio at the friction surfaces increases, and thus the power loss of the transmission increases disproportionately. In the case of ball-shaped and ball-like rolling elements, these elements are tilted around the center of gravity to change the transmission ratio, as a result of which the angle between the rotational axis of the transmission element and the rotational axis of the rolling element increases sharply during the shift to large transmission ratios. To reduce both the wear in the transmission and the loss of efficiency, the tilt angle of the rotational axes of the rolling elements is limited; as a result, the transmission ratio of the ball transmissions is usually limited to less than 400%. The above-mentioned NuVinci hub transmissions make possible, for example, a total ratio of 330-380%, whereas a ratio of up to 525% is possible with a toothed gear variant (e.g., Rohloff Speedhub), and approximately 600% is possible for derailleurs.

Continuously-variable planetary transmissions in which the rolling elements are configured as double cones are intended to overcome the essential disadvantages of the ball transmissions. These double-conical gears are known from, for example, DE 10 2013 223 381 A1 of Shimano and from DE 10 2013 012 160 A1. The double cones comprise two opposing setbacks, which form a rotational axis of the double cone and which are mounted in roller bearings. The torque-transferring elements rest on the surfaces of the cones with a vertical offset from each other. A change of ratio is achieved here by displacement of the friction surfaces along the lateral surfaces of the cones. In comparison to ball transmissions, the spin/roll ratio here is relatively constant during a change of the transmission ratio, as a result of which the efficiency losses are reduced. In addition, the more favorable contact angle between the rolling elements and the torque-transmission elements acts positively on the axial forces and thus on the friction loss in the axial bearings. As a result of these factors, a total ratio of approximately 600% is possible with an efficiency of approximately 90%.

Nevertheless, in the case of double-cone transmissions of the hub type, it is usually necessary to provide an additional gear stage (e.g., a spur gear transmission) to provide for the reversal of the rotational direction between the gear input and the gear output. This destroys some of the advantages of the continuously-variable planetary transmission and also has a disadvantageous effect on the overall efficiency of the transmission and on its complexity, cost, and especially on its weight.

In another configuration of a continuously-variable planetary transmission, the rolling elements are configured essentially in the form of rollers. A transmission of this type is known from, for example, U.S. Pat. No. 2,359,540 (equivalent to CH 265 617 A). The rolling elements disclosed here comprise two sections opposing each other in the longitudinal direction and curved convexly toward the outside, an inwardly curved center recess, and (in each case) a shaft section representing an extension in the longitudinal direction of the rolling elements, this shaft section being mounted in the transmission housing by means of a roller bearing. The two outwardly-curved sections of the rolling element are in contact with the torque-transmission elements, whereas a support element acts on the inwardly-curved, circumferential recess. The contact surfaces of the transmission elements are conical, so that they make point contact with the curved sections of the rolling elements. The support element can be shifted by means of an adjusting mechanism, so that an axial displacement of the support element brings about an axial displacement of the rolling elements. For this reason, the circumferential recess in the rolling element must have a specific contour, because an axial displacement would otherwise not be possible. As a result of this axial displacement of the rolling elements, the outwardly-curved sections of these elements slide along the conical sections of the transmission elements, as a result of which the effective radii and the transmission ratio change.

As a result of the selected rolling element geometry, furthermore, the contact angles between the rolling element and the transmission element turn out to be relatively shallow here, so that the axial forces which develop are lower than in the case of ball-shaped rolling elements. In addition, there is no need for an additional positive-fit (non-frictional) transmission stage, as is the case with the double-cone transmission. Because the rolling elements are shifted axially along the transmission elements, however, a considerable amount of space must be provided for this gear configuration, especially in the axial direction, so that the transmission ratio can be changed sufficiently. In addition to the required construction space, the considerable size of the transmission elements also has a negative effect, especially on the weight of the transmission. Because there can be only point contact between the ball-shaped surfaces of the transmission elements and the outwardly-curved surfaces of the rolling elements, very high Hertzian stresses occur at the contact points, which lead to increased wear. As can also be seen, the outwardly-curved sections of the rolling elements comprise a curved contour which is difficult to manufacture and which thus also increases the cost of the transmission. In addition, it should be pointed out that a transmission of this type can be shifted under load only with difficulty, because the three-point contact of the outer contact points is not symmetric to the supporting contact point of the planetary rolling element at most transmission ratios.

WO 2008/040281 A1 discloses a planetary transmission with continuously-variable ratio, wherein the ratio is changed by axial displacement of ring gear relative to the sun gears.

It must therefore be concluded that the various configurations of continuously-variable planetary transmissions or friction-gear transmissions which are adapted in particular to use as bicycle hub transmissions are subject to significant limitations, whereas any individual configuration is able to make use of only certain individual advantages.

SUMMARY OF THE INVENTION

It is therefore the object of the present invention to provide a continuously-variable planetary transmission which provides an increased efficiency and a wide total transmission range and which at the same time allows for a compact and simple structure and relatively low manufacturing costs. In particular, the object is to create a continuously-variable planetary transmission which offers an efficiency of more than 90% and a total transmission range of over 600%.

This object is achieved by the features of claims 16 and 17.

According to the invention, the continuously-variable planetary transmission comprises a first and a second transmission element, these elements being rotatable around a transmission axis and arranged axially at a fixed distance from each other; at least one support element, which is essentially fixed in position radially with respect to the transmission axis; and at least one elongated planetary rolling element, which is configured to be rotationally symmetric to its longitudinal axis and also rotatable around that axis. The first transmission element comprises at least one first contact point, the second transmission element at least one second contact point, and the at least one support element at least one third contact point, wherein, at the contact points, there is in each case frictional rolling contact with a planetary rolling element, so that the at least one planetary rolling element is held movably around the transmission axis between the first and second transmission elements and the at least one support element. A displacement of the center of the at least one planetary rolling element relative to the transmission elements brings about a change in the ratio of the planetary transmission. The at least one support element is essentially fixed in place axially with respect to the first and second transmission elements.

In this way, a new type and design for continuously-variable planetary transmissions is created, by means of which it is possible to overcome the disadvantages of the conventional continuously-variable planetary transmissions or friction-ring transmissions. The advantages of the planetary transmission according to the invention are obtained in particular in conjunction with the especially preferred embodiments of the planetary rolling elements.

It is advantageous for the first transmission element, the second transmission element, and the at least one support element to guide the at least one planetary rolling element, so that the center of the at least one planetary rolling element describes a circular path when the planetary rolling element is displaced to change the transmission ratio. The longitudinal axis of the at least one planetary rolling element preferably defines a longitudinal direction of the element, and the at least one planetary rolling element comprises two side sections, opposing each other in the longitudinal direction, the lateral surfaces of which are convexly curved in the longitudinal direction (outwardly, when seen from the longitudinal axis), so that the planetary rolling element tapers down with respect to the longitudinal axis toward each of the two longitudinally opposing end sections of the planetary rolling element. It is especially preferable for the convex curvatures of the lateral surfaces of the two side sections to have a constant radius in the longitudinal direction.

In comparison to friction-gear transmissions with ball-shaped or ball-like rolling elements, the planetary transmission according to the invention, in its preferred embodiments, offers the decisive advantage that the spin/roll ratios at the friction surfaces between the rolling elements and the two transmission elements are much smaller even when there is a change from a low to a higher speed ratio, and thus the effective coefficient of friction can be increased. In association with that, the losses and wear phenomena are reduced, and the overall efficiency of the transmission is increased. These advantages are obtained essentially through the elongated, essentially roller-shaped geometry of the planetary rolling element and through the displacement of the center of the rolling elements to change the transmission ratio. Because, in the transmission according to the invention, it is possible, in conjunction with the preferred rolling element geometry, for the displacement of the center point to occur around a center which is as far outside the planetary rolling elements as possible, the goal is achieved that, even at high transmission ratios, the angle between the rotational axis of the transmission elements and the rotational or longitudinal axis of the planetary rolling elements remains as small as possible. A small spin/roll ratio and thus smaller losses are the result. In addition, the angle resulting from the geometry of the rolling elements between the transmission axis and a tangent to the planetary rolling element contour at the contact points with the transmission elements (also called the "contact angle" below) is much smaller. This has a positive effect on the axial forces which occur, which must be absorbed by the transmission housing.

This effect is amplified, furthermore, in comparison to the friction-gear transmissions known so far with ball-like or even roller-like rolling elements, in which the rolling elements are tilted or axially shifted by the displacement of the support element, by the fact that it is not the support element which displaces the planetary rolling elements. The support element according to the invention is fixed in position axially with respect to the first and second transmission elements. It is preferred here that the support element also be fixed in position axially with respect to the transmission axis. A circumferential recess around the middle of the planetary rolling element can therefore be made much flatter, because there is no need for the support element to act on the rolling elements to displace them. As a result, an even flatter shape of the planetary rolling elements is made possible, as a result of which the contact angles between the planetary rolling elements and the transmission elements of the axial forces which develop can be reduced even more. Because the first and second contact points are essentially fixed in the axial direction, furthermore, the transmission elements can be very narrow, as a result of which the space required to accommodate them and their weight can be reduced. It is obvious that, as an alternative, the first transmission element, the second transmission element, and the support element, which are essentially fixed in position axially with respect to each other, can be shifted relative to the at least one planetary rolling element. Here, too, the restricted guidance provided to the at least one planetary rolling element is maintained, so that the previously described advantages also apply to this embodiment.

The key point is that, because the transmission elements are at a fixed axial distance from each other and because the curvature of the lateral sections of the planetary rolling elements is constant in the longitudinal direction, the contact angles, firstly, are the same at every angular position of the planetary rolling elements; and, secondly, the contact angle at the first contact point is preferably equal to the contact angle at the second contact point. Even when the ratio is changed, the axial and radial forces which develop at the first and second contact points remain in equilibrium. This force equilibrium has an advantageous effect on the design of the overall transmission, especially of the transmission housing; it also reduces wear; and it offers in particular the advantage that the axial forces essentially cancel each other out, which therefore enables a very easy shifting of the transmission even under load. An asymmetric force distribution between the forces which occur at the first and second contact points always results in an increase in resistance when the attempt is made to change speed under load.

Overall, the transmission according to the invention, especially the transmission in its preferred embodiments, is optimized with respect to the spin/roll ratios at the contact points of the planetary rolling elements and with respect to the resulting (axial) forces in such a way that there is no apparent need to impose a limit on the transmission ratio. In comparison to friction-ring transmissions with ball-shaped or ball-like rolling elements, what results from this is a significantly wider overall range of transmission ratios. In comparison to previous friction-ring transmissions with essentially roller-shaped rolling elements, it is in particular the efficiency and ease of changing speeds which are increased.

The at least one planetary rolling element preferably comprises a circumferential recess located in the middle with respect to the longitudinal direction. The third contact point between the planetary rolling elements and the support element is located in this recess. The lateral surface of the circumferential recess is preferably concave in the longitudinal direction (curved inwardly, when seen from the longitudinal axis), wherein this concave curvature in the longitudinal direction has a constant radius. Because of the curvature of the side sections and of the circumferential recess with their constant radii, the planetary rolling element is especially easy to manufacture, which has an advantageous effect in particular on production costs. Ideally, the radii of the curvature of the first and second side sections and of the circumferential recess, when seen in a longitudinal cross-section along the longitudinal axis, have the same center. The result of this especially advantageous configuration of the planetary rolling element is that the center of the planetary rolling element moves along a circular path (the center of which is also at the center of the just-described radii) during the guided displacement of the planetary rolling element for the purpose of changing the transmission ratio.

In one embodiment of the continuously-variable planetary transmission according to the invention, the at least one support element comprises exactly one third contact point, which lies on an axis of symmetry, with respect to which the at least one first contact point and the at least one second contact point are arranged in an axially symmetric manner. The first, second, and third contact points thus form a three-point support for a planetary rolling element. This promotes the symmetrical force distribution in an especially advantageous manner, because the radial forces occurring at the first and second contact points are absorbed centrally at the third contact point, which is arranged symmetrically to them.

In another embodiment of the planetary rolling element, the circumferential recess has a V-shaped cross-section. The lateral surface of the at least one support element is then preferably convexly curved in the axial direction of the transmission axis and has a constant radius. In this case, the at least one support element comprises two third contact points, so that the first, second, and two third contact points form a four-point support for a planetary rolling element. As a result of the additional contact point, the surface pressure occurring at each individual third contact point between the planetary rolling element and the support element is reduced. Wear can therefore also be reduced.

In an alternative embodiment, the at least one support element can have a multi-part configuration. As a result, it is possible to design the support element in such a way that a four-point support can be realized even in the case of a planetary rolling element which has a circumferential recess with a constant radius in the longitudinal direction. Here again, the surface pressure at the third contact points is reduced as a result. In comparison to the circumferential recess with the V-shaped cross-section, however, this variant offers the considerable advantage that the two third contact points can be arranged symmetrically to the axis of symmetry between the first and second contact points. Once again, therefore, the forces are in a symmetrical relationship to each other. With respect to the changing of the transmission ratio of the planetary transmission under load, a symmetrical force distribution is always to be desired, specifically both in the case of a three-point support and in the case of a four-point support. The at least one support element can, for example, have a two-part configuration, wherein the two halves are arranged axially next to each other. Between the two halves of the at least one support element, means such as magnets or spring elements can be provided, which push the two halves of the at least one support element axially apart. In this way, a preload or pretensioning force is produced, which acts on the at least one planetary rolling element at the at least one third contact point. At least the radial component of this pretensioning force therefore pushes the at least one planetary rolling element radially outward and against the first and second transmission elements at the at least one first and the at least one second contact point. The pretension between the at least one planetary rolling element and the first and second transmission elements can thus be increased, especially in the load-free state. This makes it possible to eliminate almost completely any slippage at the at least one first and the at least one second contact point, especially when starting off. The planetary transmission preferably also comprises a first and a second torque-dependent pressing device, wherein a pressing device is connected to each of the first and second transmission elements, and wherein the two pressing devices have the effect of pressing the first and second transmission elements against the at least one planetary rolling element. The transmission elements are pressed against the planetary rolling elements by the pressing devices as a function of the torque in order to ensure the most slip-free possible transmission of the torque between the transmission elements and the planetary rolling elements. The pressing devices preferably comprise a certain pretension, so that the transmission elements are pressed sufficiently against the planetary rolling elements even in the resting state of the transmission and thus so that the transmission can start to operate with as little slippage as possible. The pretension can be achieved by means of, for example, the use of springs or magnets.

So that the transmission ratio can be changed in optimal fashion, the planetary transmission also comprises an adjusting device for displacing the at least one planetary rolling element, wherein the adjusting device acts on at least one end section of the at least one planetary rolling element. An adjusting device of this type is of simple structure and design and is especially well-adapted to the transfer of a corresponding adjusting movement to the planetary rolling elements while the transmission elements and the support element are essentially stationary.

The method according to the invention for changing the ratio of a continuously-variable planetary transmission comprises the following steps:
(a) producing an adjusting movement at the input of an adjusting device;
(b) transferring the adjusting movement to at least one end section of at least one planetary rolling element by means of the adjusting device;
(c) displacing the center of the at least one planetary rolling element along a circular path in response to the adjusting movement and thus changing the ratio.

In this way, the above-described advantages of a continuously-variable planetary transmission according to the invention can be optimally exploited, and the ratio can be easily changed even under load.

It is preferable for the transfer of the adjusting movement to at least one end section of the at least one planetary rolling element to comprise the axial displacement of a guide element, wherein the end sections of the at least one planetary rolling element are supported in the guide element. An adjustment of this type is especially easy to realize, and the amount of manufacturing effort required to implement it in the continuously-variable planetary transmission according to the invention is modest.

BRIEF DESCRIPTION OF THE DRAWINGS

Additional features and advantages of the present invention can be derived from the following description under reference to the drawings:

FIGS. 6a, 6b, and 6c show three cross-sectional views according to FIG. 1a with the planetary rolling elements in different angular positions (overdrive—one-to-one transmission—underdrive);

DETAILED DESCRIPTION OF THE DRAWINGS

Figure 1A:
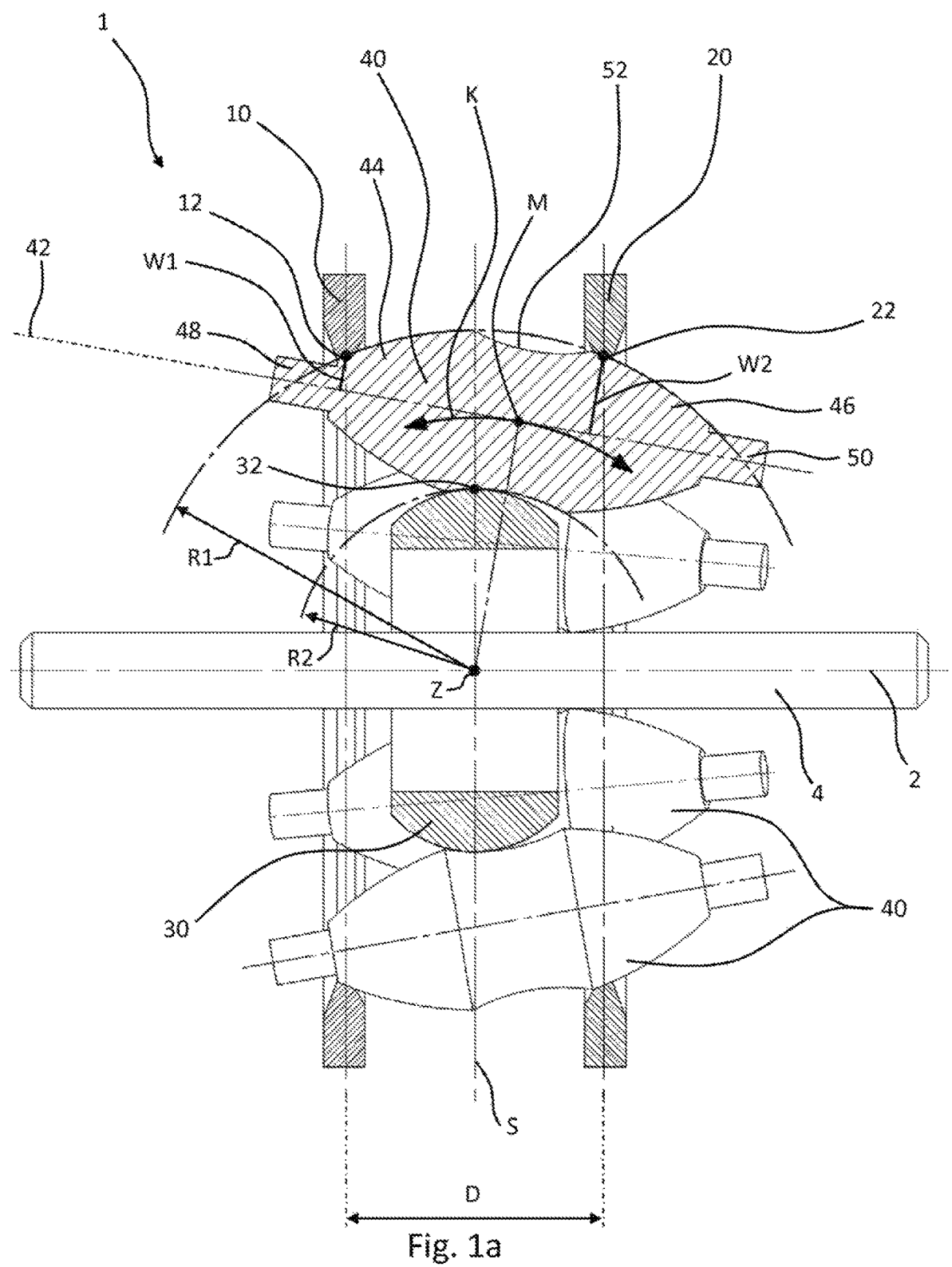
FIG. 1a shows a schematic cross-sectional view of the essential components of a first embodiment of the planetary transmission according to the invention.

FIG. 1a shows a schematic cross-sectional view of the components of a first embodiment of the continuously-variable planetary transmission which are essential to the function of the transmission. These form the foundation of the transmission, which can be used in various areas and adapted as appropriate to the existing circumstances. Two exemplary embodiments of the transmission according to the invention as complete bicycle hub transmissions are described with reference to FIGS. 9 and 10.

Each of FIGS. 1-6, 9, and 10 shows a cross-sectional view. The cross-sectional plane is defined by the straight line of the transmission axis 2 and the straight line of the longitudinal axis 42 of a planetary rolling element 40.

FIG. 1a shows a transmission axis 2, which can, but does not necessarily have to be, configured as a continuous gear shaft 4, and around which a first transmission element 10, a second transmission element 20, at least one planetary rolling element 40, and a support element 30 are arranged. The transmission elements 10, 20 are configured as friction rings and are supported rotatably around the transmission axis 2. A torque to be transmitted is introduced at a transmission input to its transmission element 10 or 20, is transferred from this element via at least one planetary rolling element 40 to the other of the two transmission elements 10 or 20, and is transferred from there finally to an element configured as the transmission output. The transmission input is formed by, for example, a sprocket, which is driven by a bicycle chain, wherein in this case the hub housing and the associated wheel are configured as the transmission output.

The at least one planetary rolling element 40 is elongated, rotationally symmetric around its longitudinal axis 42, and rotatable around that axis. A planetary rolling element 40 is in frictional rolling contact at a first contact point 12 with the first transmission element 10, at a second contact point 22 with the second transmission element 20, and at least at one third contact point 32 with the support element 30. This means that a torque is transmitted from a transmission element 10, 20 configured as a friction ring by a frictional connection to the planetary rolling element 40 and vice versa. Depending on the geometry of the elements connected to each other, the contact points 12, 22, 32 can be in the form of contact points, contact lines, or even contact surfaces. Especially at high contact pressures, the elements at the contact points are deformed in such a way that a contact surface with an ellipsoidal outline, for example, is formed. A contact point 12, 22, 32, however, is also considered present even if a gap is present between the transmission elements 10, 20 or the support element 30 and the planetary rolling element. The transmission is usually installed in a housing filled with a special friction wheel oil. These oils facilitate a force to be transferred between the friction elements, wherein at the same time a gap on the order of less than 1 μm can be provided. The pressures which occur at the contact points and, in association with that, the wear of the elements can thus be reduced.

The transmission ratio of the planetary transmission 1 is defined as the ratio of the effective radii to each other. The effective radii are defined in turn as the distances extending through the contact points 12, 22 perpendicular to the longitudinal axis 42 of the planetary rolling element 40. For example, the effective radius W1 extends between the first contact point 12 and the longitudinal axis 42 of the planetary rolling element 40, and the effective radius W2 extends between the second contact point 22 and the longitudinal axis 42 of the planetary rolling element 40. To change the transmission ratio, the planetary rolling elements 40 are displaced relative to the first and second transmission elements 10, 20. This displacement consists of a radial and an axial (relative to the transmission axis 2) movement component, so that the center M of the planetary rolling element 40 moves along a circular path K when displaced. With respect to FIG. 1a, this means that the center M is displaced in the plane of the drawing. The radial movement component is imposed on the at least one planetary rolling element 40 by an adjusting device 80, as can be seen from FIGS. 7-10, for example. The axial movement component results from the guidance of the planetary rolling elements 40 provided by the first and second contact points 12, 22 during the radial displacement of an end section 48, 50 of the planetary rolling elements 40.

All told, the planetary rolling element 40 can rotate around its longitudinal axis 42 and can be displaced to change the transmission ratio. It is obvious that the description of this displacement for the purpose of changing the transmission ratio on the basis of FIG. 1a refers to the cross-sectional view shown therein, whereas the movements or paths of movement during operation of the transmission according to the invention are superimposed on it. The displacement described here for the purpose of changing the transmission ratio always pertains to a displacement of the planetary rolling element 40 relative to the first and second transmission elements 10, 20. In an alternative embodiment, it is conceivable that the first transmission element 10, the second transmission element 20, and the support element 30, which are fixed in position axially with respect to each other, could shift relative to at least one planetary rolling element 40. The geometric characteristics of the transmission components in particular are not affected by this.

The advantages of the planetary transmission 1 according to the invention are made possible in particular by the especially preferred geometric design of the planetary rolling elements 40. FIG. 1a shows a cross-section of a planetary rolling element 40 through its longitudinal axis 42. It can be seen that the planetary rolling element 40 has an elongated, essentially roller-like, bellied shape. The planetary rolling element 40 is rotationally symmetric around its longitudinal axis 42 and comprises two side sections 44, 46, which oppose each other in the longitudinal direction, which is defined by the longitudinal axis 42; the rolling element also comprises two end sections 48, 50, also opposite each other in the longitudinal direction. In the middle, between the two side sections 44, 46 there is a circumferential recess 52. The end sections 48, 50 are preferably configured as cylindrical shaft sections forming an integral part of the planetary rolling element 40. It is also possible, however, for a separate shaft or axle to be supported in a bore passing through the planetary rolling element; this shaft can be either fixed or mounted rotatably by the use of, for example, roller bearings, wherein the two end sections 48, 50 are formed by two sections of the shaft projecting out from the planetary rolling element 40. It is also conceivable that one end section 48 or 50 could be an integral part of the planetary rolling element 40 and the other end section 48 or 50 could be formed by a shaft mounted in an opening in the planetary rolling element 40.

Now it is especially preferred that the lateral surfaces of the side sections 44, 46 be convexly curved in the longitudinal direction, so that the planetary rolling element 40 tapers or narrows down with respect to the longitudinal axis 42 toward the end sections 48, 50. Ideally, the convex curvatures of the lateral surfaces of the two side sections 44, 46 have a constant radius R1 in the longitudinal direction. The lateral surface of the circumferential recess 52 is preferably curved concavely in the longitudinal direction, wherein this concave curvature has a constant radius R2 in the longitudinal direction. Ideally, the radii R1 of the side sections 44, 46 and the radius R2 of the circumferential recess 52 have a common center point Z. It should be noted that the curvature of a surface is defined by at least two radii. A radius of the curvature of the lateral surfaces of the side sections 44, 46 transverse to the longitudinal direction, however, is necessarily constant because of the rotational symmetry of the planetary rolling element and can therefore be omitted from further consideration.

According to the invention, the transmission elements 10, 20 are arranged at a fixed distance D from each other, wherein an axis of symmetry S is defined, with respect to which the first contact point 12 and the second contact point 22 are arranged in an axially symmetric manner. It is obvious that, on consideration of the contact points of all the planetary rolling elements 40, the axis of symmetry S forms a plane of symmetry perpendicular to the plane of the drawing. Because both the transmission elements 10, 20 and the support element 30 are essentially fixed in position axially with respect to each other or are stationary, the contact points 12, 22 and 32 are also essentially fixed in position axially with respect to each other or stationary in the axial direction. It is obvious that, upon the rotation of the adjacent elements, the contact points 12, 22, 32 trace a circumferential path around the associated elements. "Essentially fixed in position axially relative to each other or stationary in the axial direction" means in this case that the transmission elements 10, 20 are pressed against the planetary rolling elements 40 by torque-dependent pressing mechanisms, so that the transmission elements 10, 20 undergo very little axial displacement. This is usually in the range of a few tenths of a millimeter or less and is therefore not to be considered further in this case.

Figure 1B:
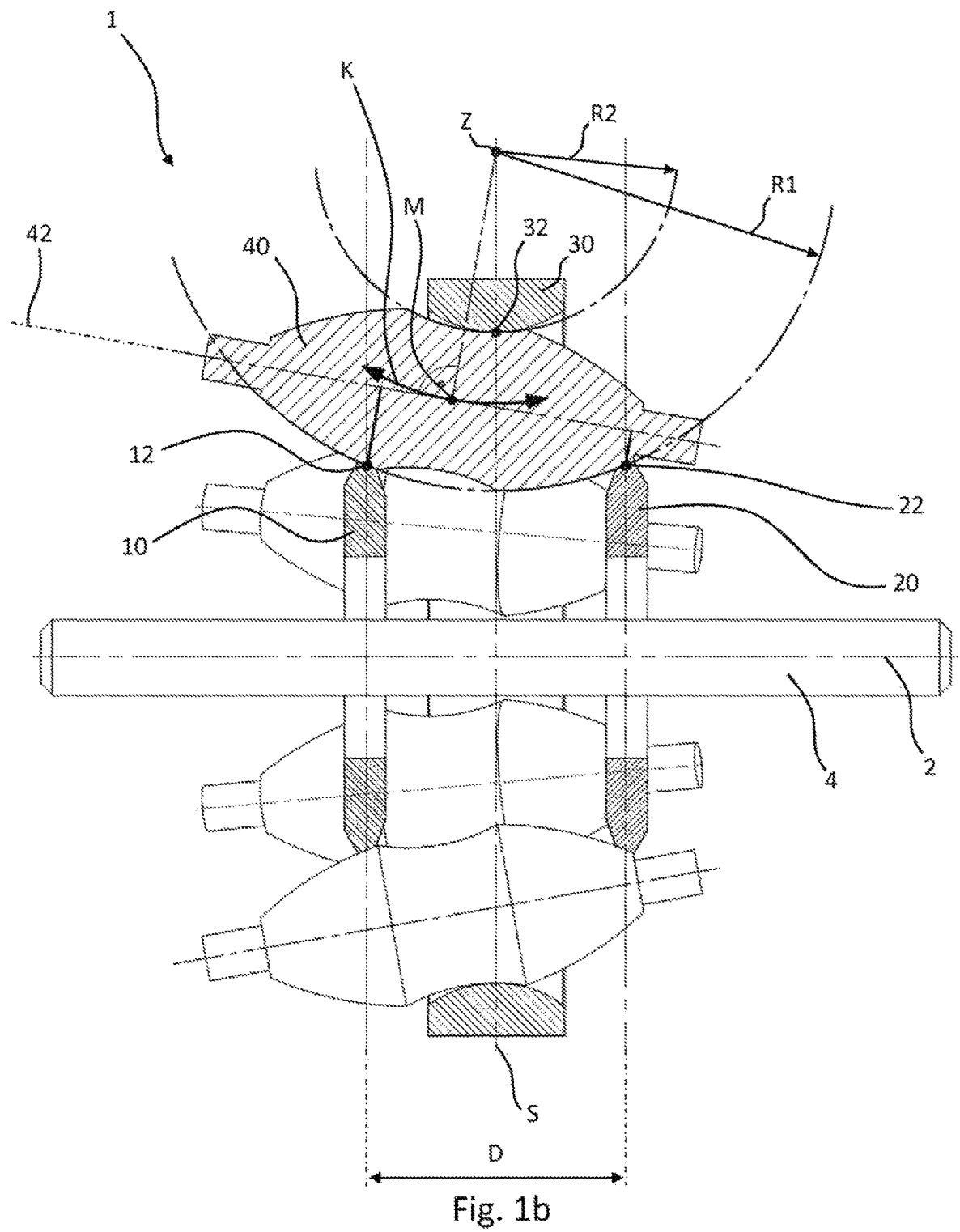
FIG. 1b shows a schematic cross-sectional view of the essential components of a second embodiment of the planetary transmission according to the invention.

When the planetary rolling elements 40 are displaced for the purpose of changing the transmission ratio, the contact points 12, 22, and 32 guide the planetary rolling elements 40. Because of the constant radii R1 and R2 and the essentially axially fixed or stationary contact points 12, 22, this displacement occurs along a circular path, so that the center M of the planetary rolling element 40 is also displaced along a circular path K. The center of this circular path K also lies on the center Z of the radii R1 and R2. The center Z thus forms both the geometric center of the radii R1 and R2 and the center of the circular path K upon displacement of the center M and simultaneously forms a center of rotation, around which the at least one planetary rolling element 40 is displaced to change the ratio of the transmission 1. Because of the symmetric arrangement of the transmission elements 10 and 20 and because of the constant radii R1 and R2, the center or rotational center Z always lies on the axis of symmetry S. In the case illustrated here, the center Z also lies on the transmission axis 2, wherein this is not absolutely mandatory, as can be seen in FIG. 1b. It is preferable, however, for the rotational center Z to be as far outside the planetary rolling element 40 as possible. This is a significant difference between the rolling element according to the invention and, for example, ball-shaped or ball-like rolling elements, in which the rotational center or rotational axis always passes through the rolling element itself, usually through its center or center of gravity. The farther the rotational center Z outside the planetary rolling element 40, the smaller the angle between the transmission axis 2 and the rotational or longitudinal axis 42 of the planetary rolling elements 40, even at extreme ratios. The spin/roll ratio therefore turns out to be correspondingly small even when the ratio is shifted to extreme values.

FIG. 1b shows an alternative embodiment of the transmission 1 according to the invention, wherein the support element 30 is arranged on the side of the planetary rolling elements 40 facing away from the transmission axis 2. In this case, the first transmission element 10 and the second transmission element 20 are arranged on the side of the planetary rolling elements 40 facing the transmission axis 2. As can be seen, the center or rotational center Z in this case also lies on the side of the planetary rolling elements 40 facing away from the transmission axis 2, outside the planetary rolling element 40, and on the axis of symmetry S. In the embodiment according to FIG. 1b, the support element 30 can be supported non-rotatably, whereas in the other embodiments it is supported rotatably on the gear shaft 4 by means of, for example, radial bearings. In principle, however, both the non-rotatable and the rotatable arrangement of the support element 30 is possible in all of the embodiments of the transmission according to the invention. As for the rest, the description of FIG. 1a given above also applies here.

Figure 2:
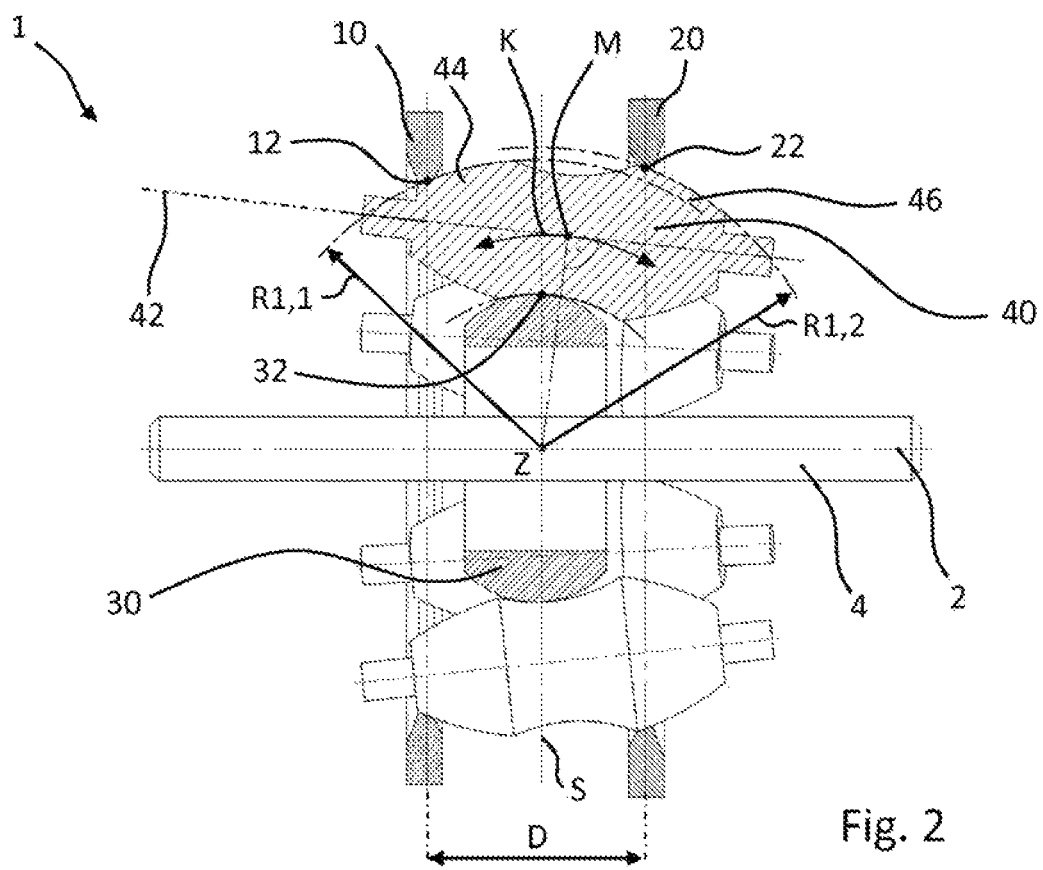
FIG. 2 shows a schematic cross-sectional view of the essential components of a third embodiment of the planetary transmission according to the invention.

FIG. 2 shows an alternative embodiment of the planetary rolling element 40. The curvature of the lateral surface of the first side section 44 in the longitudinal direction has a first radius R1,1, which is different from the radius R1,2 of the curvature of the lateral surface of the second side section 46 in the longitudinal direction. The two radii R1,1 and R1,2 are both constant and preferably have a common center Z on the axis of symmetry S. It is obvious that, in this case, the transmission elements 10, 20, which are configured as friction rings, will have different pass-through cross-sections adapted to the geometry of the planetary rolling element. It is also true here that the center M of the planetary rolling element 40 continues to move along a circular path K when the transmission ratio is shifted. The center M of the planetary rolling element 40 always lies on the longitudinal axis 42 of the planetary rolling element 40 and geometrically in the center between the end surfaces opposing each other in the longitudinal direction. It is also obvious that the center of gravity of the planetary rolling element in the case of a planetary rolling element configured in this way lies outside the center M, on the longitudinal axis 42, shifted toward the side section with the larger radius.

The constant radii R1 (or R1,1 and R1,2) and R2 not only provide advantageous guidance of the planetary rolling element 40 but also offer the advantage that the planetary rolling element can be manufactured very easily. For example, when the planetary rolling element is being ground, the constant radii can be fabricated with high precision and yet at relatively low cost.

Figure 3:
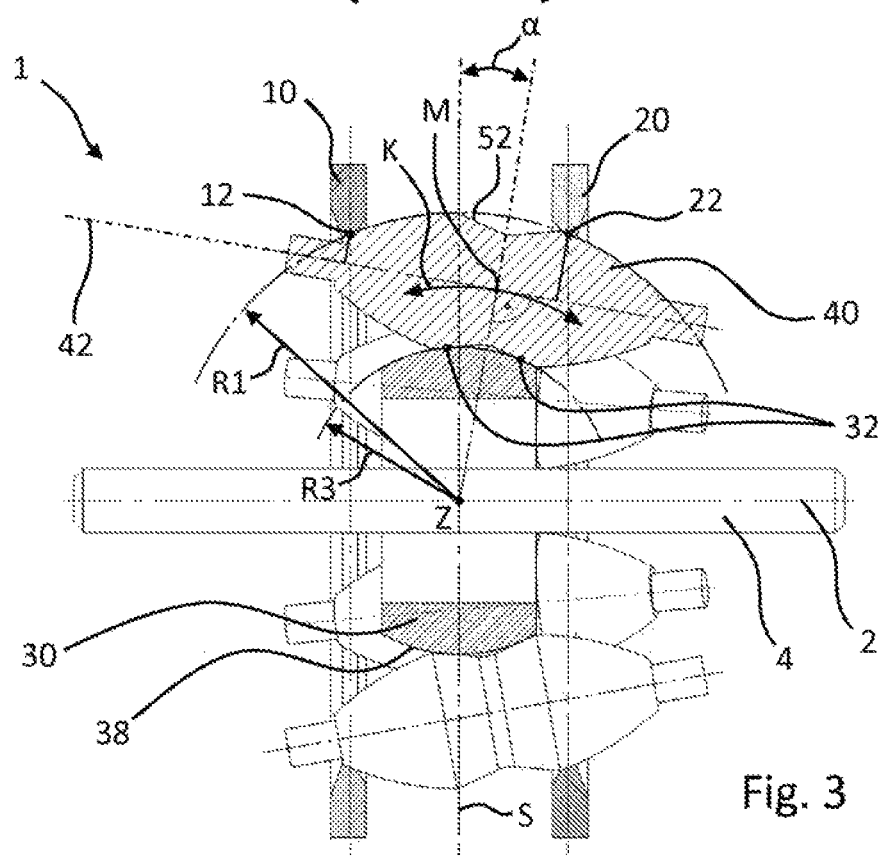
FIG. 3 shows a schematic cross-sectional view of the essential components of a fourth embodiment of the planetary transmission according to the invention.

As can also be seen in the alternative embodiment of FIG. 3, the circumferential recess 52 can have an essentially V-shaped cross-section. So that the movement of the center M of the planetary rolling elements 40 can still proceed along a circular path K, in this embodiment a radially outward-facing lateral surface 38 of the support element 30 is curved in the longitudinal direction of the transmission axis 2 with a constant radius R3. This embodiment offers the advantage that the planetary rolling element 40 is supported on the support element 30 by two third contact points 32. The radial forces which develop are therefore distributed between these two contact points 32, which results in a lower surface pressure at each individual third contact point 32. This is advantageous because of the decrease in wear, and/or the elements can be dimensioned in accordance with the reduced local load. As can also be seen in FIG. 3, however, the third contact points 32 in this embodiment are not symmetric to the axis of symmetry S in every angular position of the planetary rolling element 40. In many angular positions, this results in an asymmetric force distribution at the third contact points 32. This leads in turn to a negative effect on the forces required to change the transmission ratio and thus on the ease of shifting. The angular position of the planetary rolling elements 40 is defined by the angle α between the axis of symmetry S and the line connecting the centers M and Z.

Figure 4:
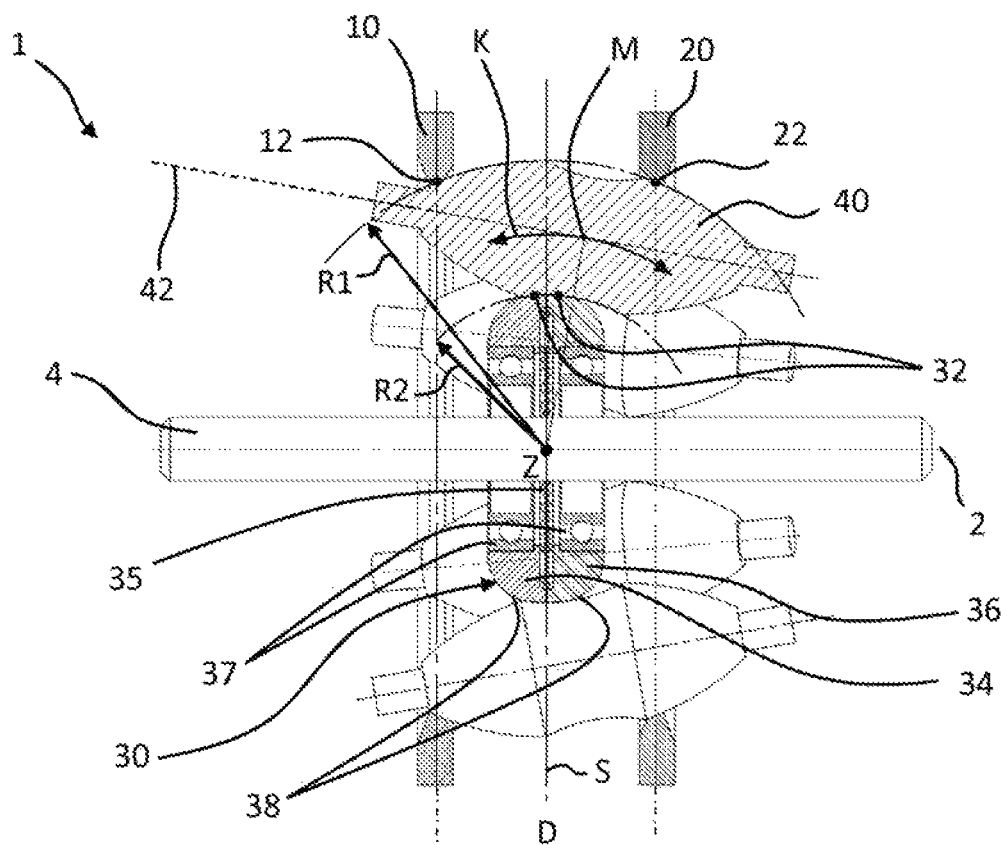
FIG. 4 shows a schematic cross-sectional view of the essential components of a fifth embodiment of the planetary transmission according to the invention.

A four-point contact for the planetary rolling element 40 is therefore preferably realized according to the embodiment of FIG. 4. Here the support element 30 consists of multiple parts. For example, it is divided in the middle into a first half 34 and a second half 36, so that the two halves 34, 36 of the support element 30 are arranged axially next to each other relative to the transmission axis 2. Between the two halves 34, 36 of the support element 30, rolling elements 35 implemented as, for example, a needle bearing or ball bearing, are preferably to be provided in order to support the relative movements between the two halves 34, 36 which may occur. It is also possible, however, to provide, for example, a gap between the two halves 34, 36 of the support element 30, or the halves 34, 36 can be fabricated from suitable materials which allow the two halves 34, 36 to slide along each other, which makes it unnecessary to provide rolling elements 35. Means which generate an axially directed force between the two halves, 34, 36, i.e., a force which pushes the two halves 34, 36 axially apart, can also be provided between the first half 34 and the second half 36. Springs or magnets, for example, can be considered appropriate means for this purpose. The magnets can be configured as magnetic rings, for example, wherein a magnetic ring is supported in each half 34, 36 of the support element 30 in such a way that the same poles are facing each other and therefore produce a repelling force between the two halves 34, 36. The axial pushing-apart of the two halves 34, 36 of the support element 30 produces a radial force component at the third contact points 32, and this force component pushes the planetary rolling elements 40 radially outward and against the first and second transmission elements 10, 20. This ensures that there is already a force pressing the planetary rolling elements 40 against the first and second transmission elements 10, 20 from the very beginning.

Figure 9:
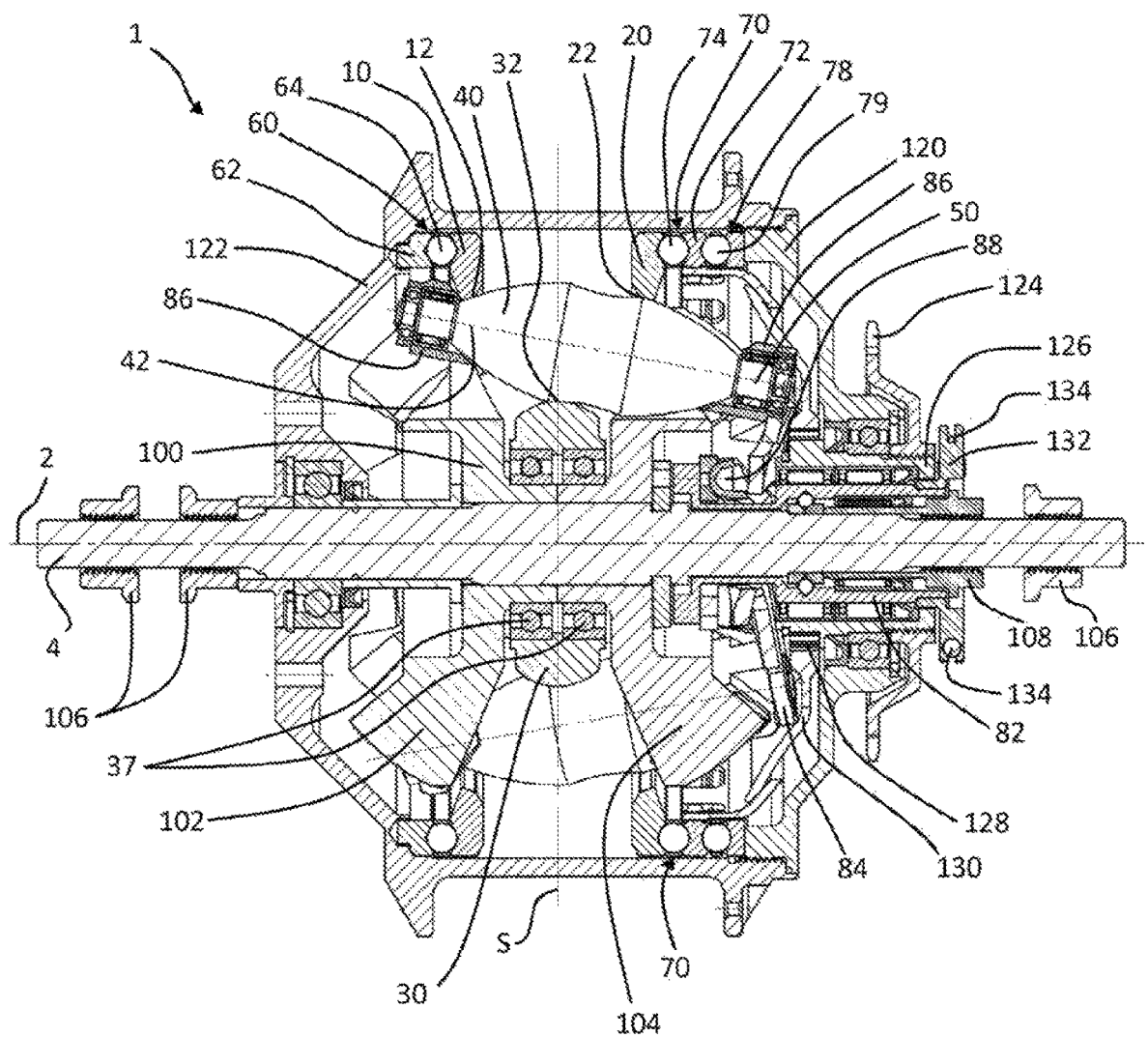
FIG. 9 shows a cross-sectional view through a first embodiment of a continuously-variable planetary transmission according to the invention, which is configured as a bicycle hub transmission.
Figure 10:
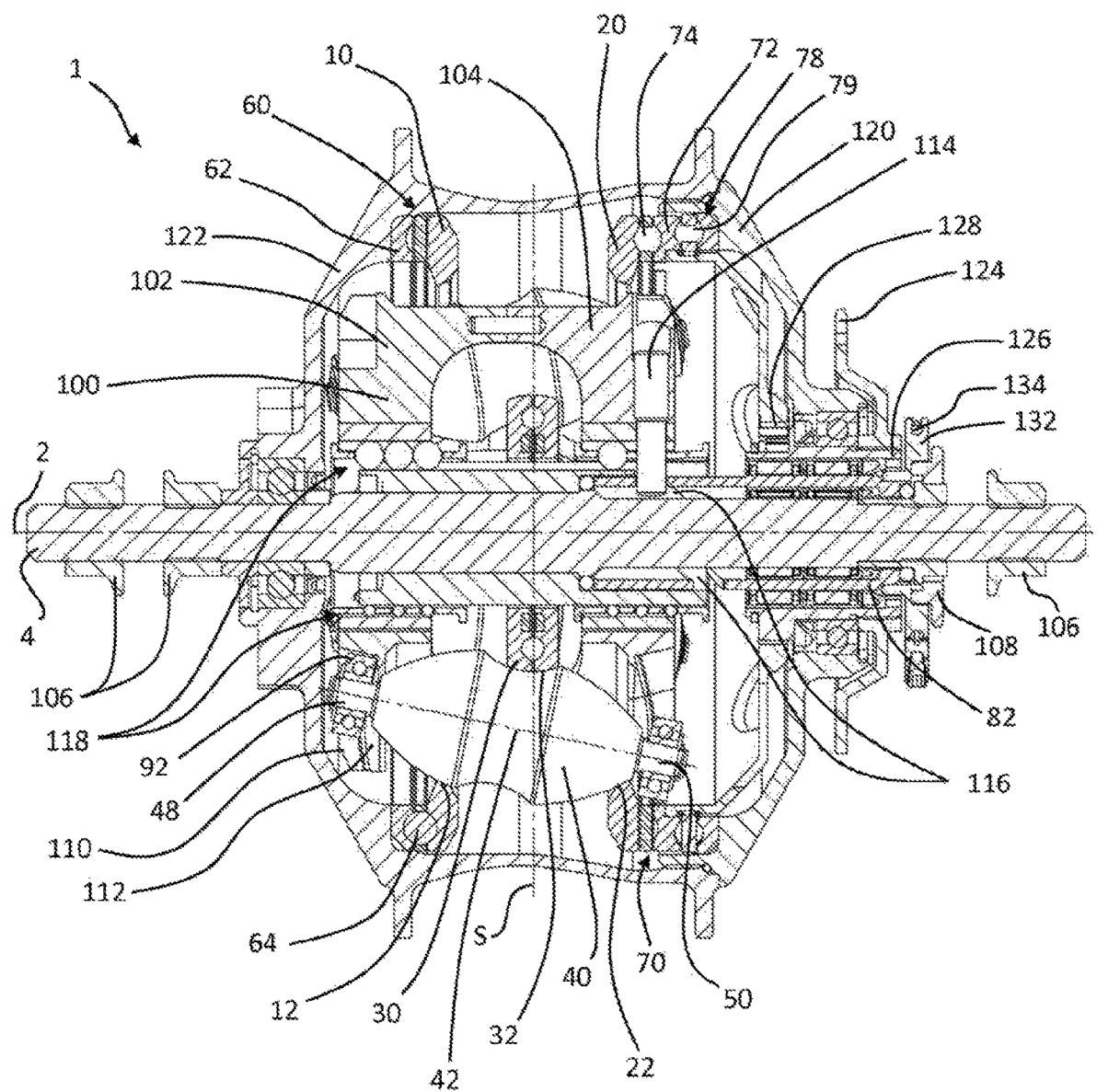
FIG. 10 shows a cross-sectional view through a second embodiment of a continuously-variable planetary transmission according to the invention, which is configured as a bicycle hub transmission.

Each half 34, 36 of the support element 30, furthermore, can have a roller bearing 37, e.g., a ball bearing, by which the support element 30 is connected to the gear shaft 4 or other elements of the transmission 1, as is described, for example, with reference to FIG. 9. Alternatively, the support element can be connected non-rotatably to the gear shaft 4. If the rotational center Z of the planetary rolling element 40 does not come to lie on the transmission axis 2, the one-part or multi-part support element 30 can also be held suspended in position without any additional guidance as shown in FIG. 10.

In the embodiment according to FIG. 4, the lateral surfaces 38 of the support element 30 are to be configured in such a way that the support element 30 comprises two third contact points 32 for each planetary rolling element 40. If the curved contour of the radial lateral surface 38 of the two halves 34, 36 of the support element 30 are identical, i.e., axially symmetric to the axis of symmetry S, then the two third contact points 32 are also axially symmetric to the axis of symmetry S. As a result, a symmetrical force distribution is achieved at the third contact points 32, which, in conjunction with the symmetric force distribution at the first and second contact points 12, 22, has an advantageous effect on the (manual) force required to change the ratio and thus on the ease of shifting. In addition, the surface pressure at each of the two third contact points 32 is cut in half.

In addition to the two-part or multi-part configuration of a support element 30, it is also conceivable that several support elements 30 could be used. In this case, the individual radial lateral surfaces of the plurality of support elements form a common lateral surface 38, by which the multiple support elements are in contact with the planetary rolling elements 40. Care must be taken here to ensure that either the contour of the common lateral surface 38 of all the support elements 30 forms a constant radius in the longitudinal direction of the transmission axis 2 or that the recess 52 in the planetary rolling element 40 is configured with a constant radius in accordance with the description given above.

Figure 5:
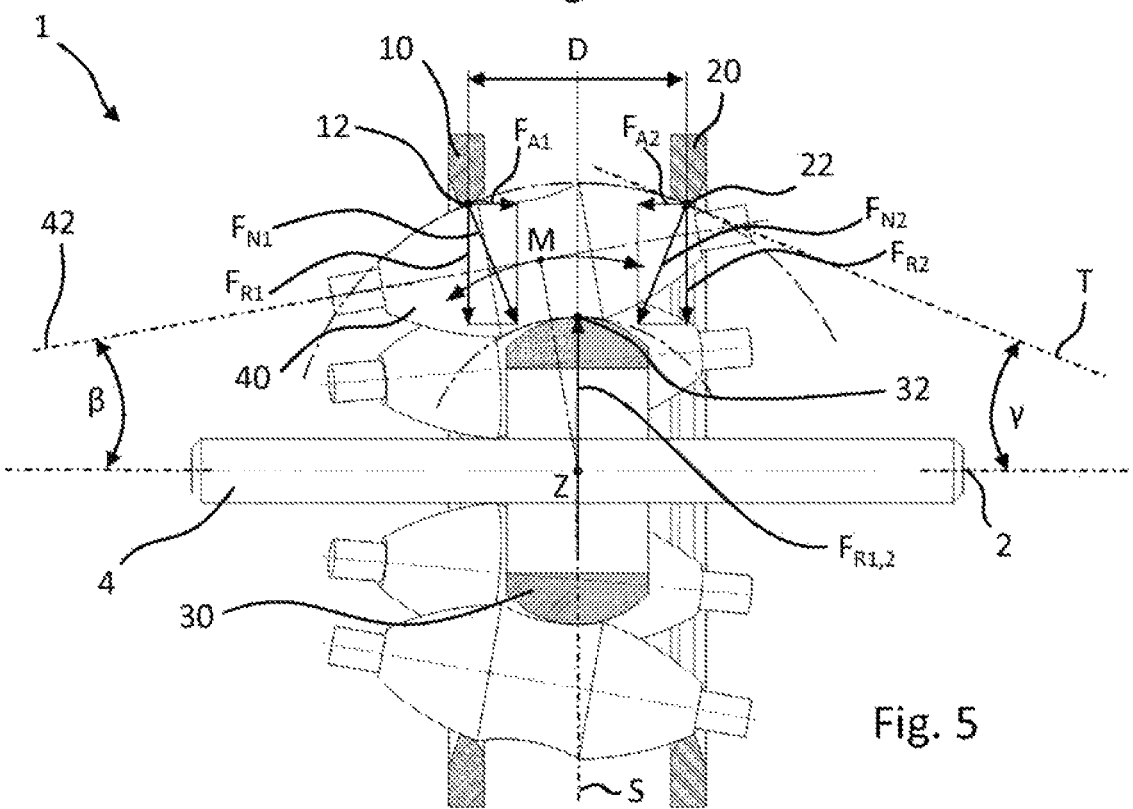
FIG. 5 shows a cross-sectional view according to FIG. 1a, from which the force relationships between the individual components can be derived.

The above-described force distribution, i.e., force equilibrium, at the first and second contact points 12, and 22 can be derived in particular from FIG. 5. When the planetary transmission 1 receives a torque at the transmission input, it is transferred by a pressing device (not shown, see FIG. 9), among other elements, to a transmission element configured as the transmission input. In the case illustrated, let the transmission element 20 be configured as the transmission input. Because of the torque-dependent pressing device, as described in greater detail with reference to FIG. 9, a torque-dependent pressing force oriented axially to the transmission axis 2 acts on the transmission element 20. This force produces an axial force FA2 at the second contact point 22 between the second transmission element 20 and the planetary rolling element 40. The force FA2 at the second contact point 22 brings about for its own part the axial reaction force FA1 at the first contact point 12 of the first transmission element 10. Because the axial forces FA1, FA2 both act on slanted contact surfaces, as indicated by the angle γ between the transmission axis 2 and the tangent T to the second contact point 22, the axial forces FA1, FA2 produce radial reaction forces FR1, FR2 at the first and second contact points 12, 22.

Because of the constant distance D between the first transmission element 10 and the second transmission element 20 and the constant radii R1 (R1,1 and R1,2) of the side sections 44, 46 of the planetary rolling elements 40, the geometric relationships at the two contact points 12, 22 are the same at every angular position of the planetary rolling elements 40 (as mirror images of each other with respect to the axis of symmetry S). The two equal axial forces FA1 and FA2 therefore also result in the same radial forces FR1 and FR2. The sum of the axial force component (FA1 or FA2) and the radial force component (FR1 or FR2) corresponds to the normal force FN (FN1 or FN2), which acts at the associated contact point 12, 22 perpendicularly to the surface of the planetary rolling element 40 (i.e., to the tangent T).

As can be derived from FIG. 5, the equal axial force components FA1 and FA2 point in opposite directions, so that the axial contact forces cancel each other out. The sum of the radial forces FR1, FR2 is absorbed at the third contact point 32, as indicated in FIG. 5 by the force FR1,2. Because the axial forces FA1 and FA2 cancel each other out, they do not oppose the force required to displace the planetary rolling element for the purpose of changing the ratio. In the case of transmission designs with an asymmetric force distribution, an axial force predominates when the planetary rolling element is not in the normal position (pure force or moment transmission). The difference between the axial forces then opposes the force required to change the transmission ratio. This illustrates the advantage of the transmission according to the invention, namely, that the transmission 1 is easier to shift and thus the convenience of operating it is increased. It can be seen that, in the case of a four-point support, the radial force FR1,2 absorbed by the support element 30 is divided between two third contact points 32. The division takes place in accordance with the geometric relationships, wherein here, too, a symmetric force distribution is to be sought. This goal is achieved by, for example, the exemplary embodiment according to FIG. 4.

FIGS. 6a, 6b, and 6c show the planetary rolling elements 40 in three different angular positions α. In the diagram according to FIG. 6b, the transmission 1 is in its normal position, and the angle α is 0°. The longitudinal axis 42 of the planetary rolling elements 40 is parallel to the transmission axis 2. The effective radius W1 is equal to the effective radius W2, which results in a transmission ratio of 1. One speaks in this case of pure or one-to-one force or moment transmission, because the input torque is essentially equal to the output torque.

In the diagram according to FIG. 6a, the planetary rolling elements 40 are displaced by the angle α toward the transmission output (transmission element 10). Accordingly, the effective radius W1 on the transmission output side is larger than the effective radius W2 on the transmission input side (transmission element 20). This results in a transmission ratio of greater than 1, i.e., an overdrive.

In the diagram according to FIG. 6c, the planetary rolling elements 40 are displaced by the angle −α toward the transmission input (transmission element 20). Accordingly, the effective radius W2 is larger than the effective radius W1, which results in a transmission ratio of less than 1. In this case, one speaks of underdrive.

As can be derived from the combination of FIGS. 6a-6c, the first and second contact points 12, 22 are arranged at the same axial distance from each other at every angular position α of the planetary rolling elements 40. In particular, the third contact point 32 on the axis of symmetry S is symmetric to the first and second contact points 12 and 22 at every angular position α of the planetary rolling elements. This means that the support element 30 is fixed in position axially relative to the first and second transmission elements 10, 20. The distance D between the first transmission element 10 and the second transmission element 20 does not change when the transmission ratio is changed. Independently of the number and arrangement of the third contact point(s) 32, the angle γ between the transmission axis 2 and the tangent T to the second contact point does not change either. The same is true for the angle of a tangent to the first contact point 12. Accordingly, the axial forces which develop are equal, regardless of the angular position α of the planetary rolling element 40 and thus cancel each other out and produce radial forces of equal value. This is also essentially the situation in the case shown in FIG. 2, in which the two side sections 44, 46 of the planetary rolling elements 40 have different radii R1,1 and R1,2, which have a common center Z. Here it must be taken into consideration that the tangent to the contact point 22 with the larger radius R1,2 is somewhat less tilted to the transmission axis 2; i.e., the angle γ becomes smaller. In this case, the orientation of the resulting force at the contact point 22 changes slightly. So that a force equivalence can nevertheless be obtained, the contact point 22 and thus also the geometry of the transmission element 20 must be adapted: the contact point 22 is shifted slightly away from the axis of symmetry, and the inner radius of the transmission element 20 becomes smaller.

It can also be seen clearly from FIGS. 6a-6c how the angle β between the longitudinal axis 42 and the transmission axis 2 changes as a function of the angular position α of the planetary rolling elements 40 between the two extreme positions (FIGS. 6a and 6c). It must also be understood that the farther out the rotational center Z from the planetary rolling element 40, the smaller the maximum angle β which can occur. For the sake of an improved spin/roll ratio at the contact points 12, 22 and the associated losses, the planetary rolling element 40 is therefore to be optimized in its design in such a way that it is has the longest, flattest possible shape (small angle γ), and also so that the maximum angle β between the longitudinal axis 42 and the transmission axis 2 which can occur is as small as possible.

Figure 7A:
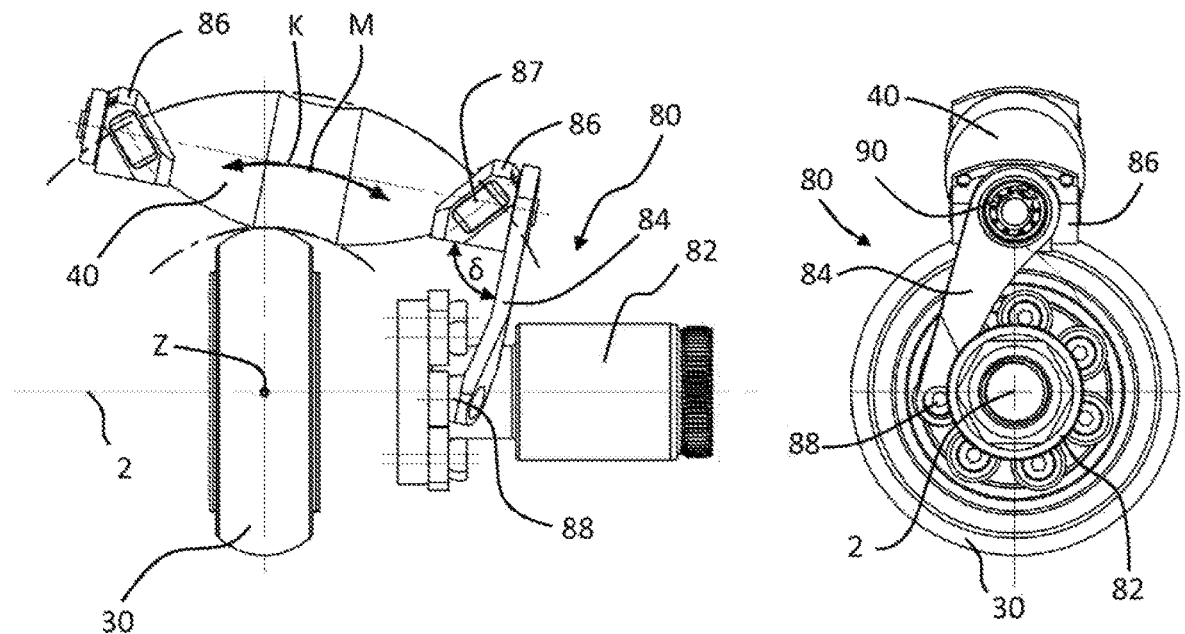
FIGS. 7a and 7b show schematic front and side views of an adjusting device.
Figure 7B:
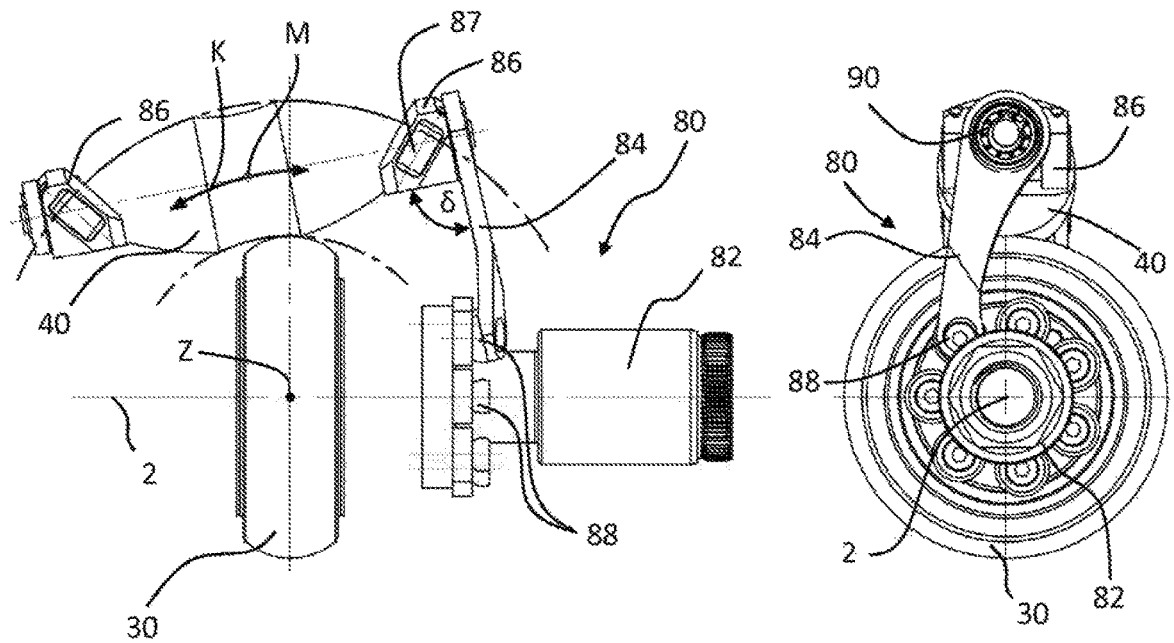

FIGS. 7a and 7b show a preferred embodiment of the adjusting device 80 for displacing the planetary rolling elements 40 and thus for adjusting the transmission ratio.

The skilled person, however, will also know of other possible ways of transferring adjusting movements to the planetary rolling elements 40 to change the transmission ratio of the transmission 1. An alternative embodiment of the adjusting device 80 can be seen by way of example in FIG. 10. The adjusting device 80 is shown in the two extreme positions, i.e., one for underdrive (FIG. 7a) and one for overdrive (FIG. 7b). For the sake of clarity, only one support element 30 and one planetary rolling element 40, which is connected to the adjusting device 80, are shown in each case. It is obvious that the components which are not shown are nevertheless present as appropriate, as they have been described, for example, with reference to FIGS. 1-6, 8, and 9. The planetary rolling element 40 is in contact with the support element 30. The end sections 48, 50 of the planetary rolling element are each supported by a roller bearing 90 in a shoe 86 of the adjusting device 80. The roller bearing 90 is preferably a fixed bearing fastened to the planetary rolling element 40. It is also possible that only one end section 48 or 50, by means of which the planetary rolling element 40 is adjusted, is supported in a shoe 86. For the sake of better guidance and support of the planetary rolling elements 40, however, it is advisable to provide both end sections 48, 50 with shoes 86. An arm 84 is also attached to the shoe 86, by means of which the planetary rolling element 40 is adjusted, wherein the shoe 86 and the arm 84 are arranged at a more-or-less fixed angle δ to each other, which is preferably about 90°. Firstly, the arm 84 is connected without play to the shoe 86 by a section of a ball and is preferably configured as a ball joint connection. Secondly, the arm 84 is connected to the carrier 82 by means of a joint head 88. The joint head 88 is preferably configured as a ball head, wherein the arm 84 comprises a corresponding socket, so that the arm 84 and the joint head 88 form a ball joint. The ball joint allows the arm 84 to move around it. It can be derived from the side views that several joint heads 88 can be provided, wherein the number of joint heads 88 should be adapted to the number of planetary rolling elements 40 being used.

To adjust the transmission ratio, the carrier 82 is rotatable independently of the transmission input or gear shaft 4. The carrier 82 can nevertheless be mounted on the gear shaft 4, so that the rotation occurs around the transmission axis 2. The shoes 86 are guided radially in a guide element 100, as will be described with reference to FIGS. 8a and 8b. As a result of the rotation of the carrier 82 and of the joint heads 88 attached to it, the end of an arm 84 connected to a joint head also undergoes a rotational movement around the transmission axis 2, and this, because of the guidance of the shoe 86 in the guide element 100, leads to a radial displacement of the shoe. The end section 50 of the planetary rolling element 40 connected to the shoe 86 is thus also pushed radially outward. Because of the guidance of the planetary rolling element 40 provided by the transmission elements 10, 20 and the support element 30, an axial movement component relative to the transmission axis 2 is imposed on the planetary rolling element when an end section 48 or 50 is radially displaced, as a result of which the center M moves along a circular path K. The end of the arm 84 connected to the shoe 86 can follow this displacement, while the end of the arm 84 connected to the joint head 88 pivots around the ball joint. The adjusting device is preferably configured to be absolutely free of play, so that all of the planetary rolling elements 40 assume the same transmission ratio position, and the torque to be transmitted is passed along at the same peripheral velocity to the transmission elements 10, 20. If this were not so, additional slippage or frictional losses would occur at the contact points 12, 22 between the transmission elements 10, 20 and the planetary rolling elements 40.

Figure 8A:
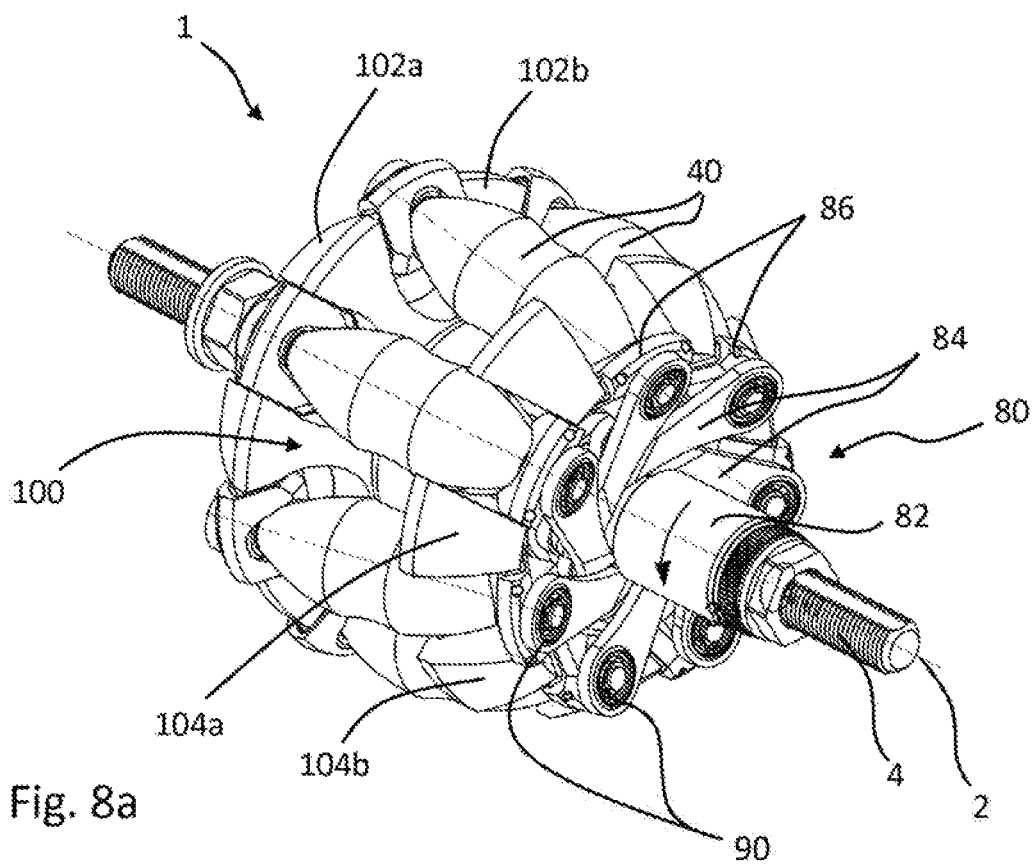
FIGS. 8a and 8b show isometric views of a hub gear transmission without the transmission housing, transmission elements, or pressing devices, in two different positions.
Figure 8B:
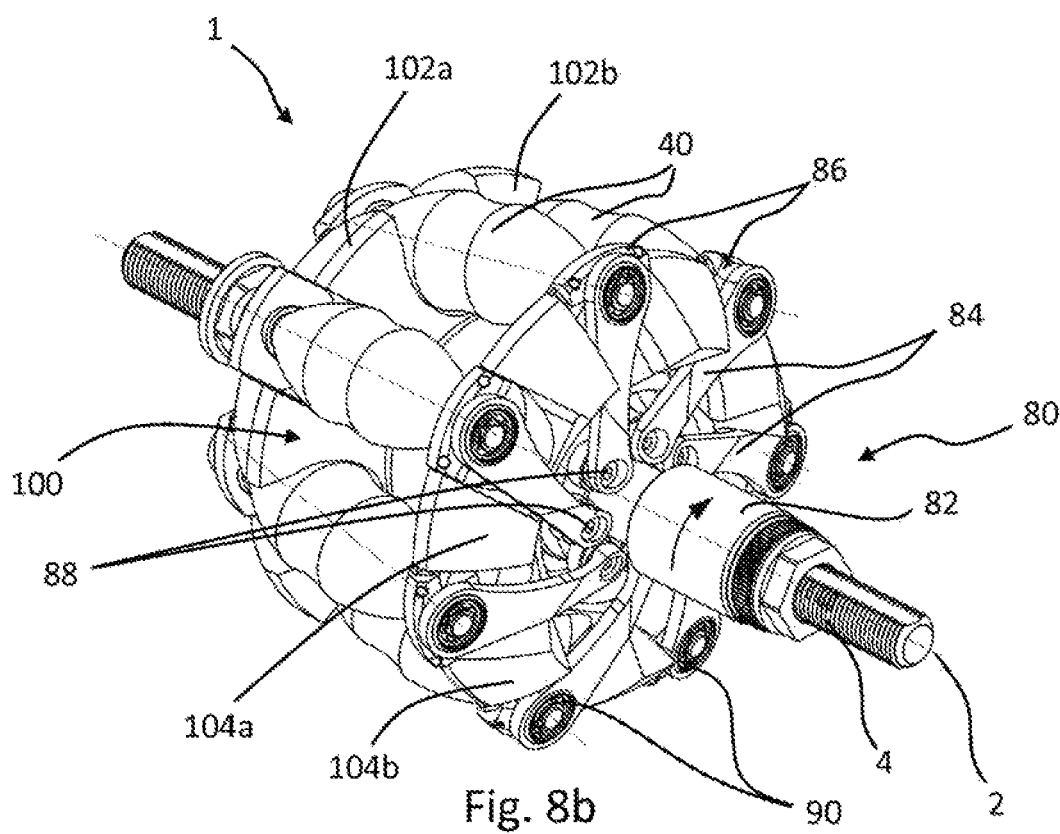

As can also be derived from FIGS. 8*a* and 8*b*, a guide element 100 is preferably provided, which can consist of a first half 102 and a second half 104. The two-part design is selected essentially because of the way the support element 30 is mounted, as can be derived from FIGS. 9 and 10. The guide element 100 is supported on the gear shaft 4 and holds the planetary rolling elements 40 at a defined distance from each other around the circumference of the transmission 1. For this purpose, the shoes 86 of the adjusting device 80 connected to the planetary rolling elements 40 are accommodated in receptacles present between two sections 102*a* and 102*b* or 104*a* and 104*b* of the guide element 100, which sections are adjacent to each other around the circumference. In particular, the shoes 86 hold up the difference in torque between the transmission input and the transmission output versus the guide element halves 102 and 104. So that the radial displacement of the shoes 86 in the receptacles between two adjacent sections 102*a* and 102*b* or 104*a* and 104*b* can proceed as free of friction as possible even under load, rolling elements 87 can be provided on the side surfaces of the shoes 86, which can be seen in FIGS. 7*a* and 7*b*. The shoes 86, however, can also be made without rolling elements 87, wherein the displacement of the shoes 86 along the guide element 100 should be supported by a suitably adapted choice of materials The guide element 100 with its two halves 102, 104 is preferably fixed in position axially and radially on the gear shaft 4. A turning of the carrier 82 of the adjusting device 80, as indicated by an arrow in each of FIGS. 8*a* and 8*b*, brings about a relative movement between the carrier 82 and the gear shaft 4, i.e., the guide element 100. As a result of this relative movement in the circumferential direction of the carrier 82 and the radial guidance of the shoes 86 in the guide element 100, the end sections 48 or 50 of the planetary rolling elements 40 connected to the arm 84 are pushed radially outward. When the carrier 82 is turned in the opposite direction, the arms 84 are rotated back in again, so that the joint heads 88 drop behind the adjacent arms 84, i.e., as a result of the displacement of the arms 84 toward the carrier 82, the joint heads become covered by them. This movement is transferred to the planetary rolling elements 40, as a result of which they are pulled back correspondingly along a circular path.

So that the planetary transmission 1 according to the invention can be better understood, FIGS. 9 and 10 show an essentially complete bicycle hub transmission. The skilled person is familiar with numerous embodiments of conventional hub transmissions for bicycles, so that, for example, the mounting of the hub housing by means of radial bearings and the sealing of the housing are not described here in detail. The skilled person is familiar in particular with numerous alternatives for the mounting of individual components, i.e., the positive (non-frictional) or non-positive (frictional) connection of individual components.

In the areas between the two connecting elements 106 and between element 106 and element 108, the gear shaft 4 is introduced into the corresponding dropouts of the bicycle frame (not shown) and connected positively and non-positively to the bicycle frame by means of the connecting elements 106, 108. The transmission housing consists of two halves 120, 122, wherein the second transmission housing half 122 is connected to the wheel of the bicycle (not shown). The transmission housing is preferably configured in such a way that the transmission housing half 122 forms a receptacle, which can be tightly sealed off by a transmission housing half 120, which is configured as a cover. The transmission housing 120, 122 should be filled with a friction oil and hermetically sealed against the environment. This results in additional advantages with respect to maintenance, contamination, and wear of the transmission.

In the embodiment according to FIG. 9, the two halves 102, 104 of the guide element 100 are positively connected to the gear shaft 4 and transfer the reaction moment (torque difference) arising at the planetary rolling element 40 via the gear shaft 4 and the connecting elements 106, 108 to the bicycle frame (not shown). The support element 30 is supported centrally on the guide element 100 (102, 104) by means of two radial bearings, which are configured as, for example, roller bearings with the rolling elements 37. The two transmission elements 10, 20 are axially supported by means of the two pressing devices 60 and 70 on the transmission housing 120, 122 and are in frictional rolling connection with the planetary rolling elements 40 at the contact points 12, 22. The support element 30 supports the planetary rolling elements 40 by at least one third contact point 32 against the transmission elements 10, 20. The planetary rolling elements 40 are arranged circumferentially around the gear shaft 4 and are held at a defined distance from each other by the guide elements 100. In addition, the planetary rolling elements 40 are supported rotatably around their longitudinal axis 42 by means of roller bearings in the shoes 86 of the adjusting device 80. The shoes 86 in turn are supported in receptacles with the freedom to shift radially; the receptacles are formed between two adjacent sections 102*a*, 102*b* or 104*a* and 104*b* of the two halves 102, 104 of the guide element 100.

In the embodiments of both FIG. 9 and FIG. 10, the pressing devices 60, 70 comprise essentially the transmission elements 10, 20 and the support rings 62, 72, wherein rolling elements 64 are arranged between the support ring 62 and the transmission element 10, and rolling elements 74 are arranged between the support ring 72 and the transmission element 20. The rolling elements 64, 74 are preferably configured as balls and rest positively in conical recesses, which are formed between the support rings 62, 72 and the transmission elements 10, 20. When the ring pairs 62 and 10 or 72 and 20, respectively, are rotated with respect to each other, the rolling elements 64, 74 create a gap between the associated ring pairs and thus an axial contact force acting on the planetary rolling elements 40. The skilled person is familiar with several alternative pressing or clamping mechanisms from the prior art. Thus, for example, it would be possible to use, instead of balls, rolling elements in the form of cylinders, which are accommodated in appropriately sloped receptacles between the rings of the pair in question. In addition, pressing devices are known in which only the centrifugal forces acting on the ball bodies push the ring pairs apart. It is also well known that these types of pressing devices 60, 70 are under slight pretension even in the absence of load. This pretension is necessary so that the transmission elements 10, 20 do not slip relative to the planetary rolling elements as the torque is just starting to build up. The pretension can be produced by, for example, springs or magnets. The transmission 1 can also be provided with only one pressing device 60 or 70. For the sake of a symmetric (force and geometric) relationship, however, the transmission 1 is preferably configured as illustrated with two pressing devices 60 and 70, one of which is configured as the first transmission element 10, the other to the second transmission element 20.

The occurring contact forces (axial forces) produced by the pressing devices 60, 70 are absorbed by the transmission housing 120, 122 in the axial direction. The first pressing device 60, i.e., its support ring 62, is positively connected to the transmission housing half 122. The second pressing device 70, i.e., its support ring 72, is braced against the housing half 120 by way of an axial bearing 78. The axial bearing 78 is formed by the support ring 72 of the second pressing device 70, rolling elements 79 (such as balls or rollers), and another support ring, which rests against the housing half 120. Here again, alternative forms which the axial bearing could take are conceivable.

In the exemplary embodiments shown in FIGS. 9 and 10, the input torque is transferred by means of a bicycle chain or a toothed belt (not shown) to a sprocket 124 or some other suitably adapted input element. The sprocket 124 is positively connected to a carrier piece 126, which is for its own part supported by rolling elements on the gear shaft 4. A ratchet freewheel 128 is connected to the carrier piece 126. Depending on the direction of rotation, the ratchet freewheel 128 positively connects to the internally toothed freewheel disk 130, which is positively connected in turn to the torque-dependent pressing device 70 or, more precisely, to the support ring 72 of that device. In this way, the torque is transferred by way of the sprocket 124, its carrier piece 126, the ratchet freewheel 128, and the freewheel disk 130 to the pressing device 70. By means of the pressing device 70, the torque is introduced via the second transmission element 20 at the second contact points 22 to the planetary rolling elements 40, wherein the balls 74 produce a torque-dependent axial contact force. The torque present at the second contact points 22 and the axial contact force cause the planetary rolling elements 40, which are in frictional rolling connection with the transmission element 20, to rotate. Via the rolling connection, also frictional, between the planetary rolling elements 40 and the first transmission element 10 at the first contact points 12, the torque is transferred to the take-off transmission element 10. Ideally, the transmission elements 10, 20 and the support element 30, i.e., their contact points 12, 22, and 32 with the planetary rolling elements 40, form a three-point support for the planetary rolling elements 40 which is symmetric to the symmetry axis (or plane) S. The torque is transferred by means of the pressing device 60 from the transmission element 10 to the hub housing 122 positively connected to the support ring 62 and thus finally to the wheel (not shown) connected to the hub housing 122.

A possible change in the transmission ratio is described essentially with respect to FIGS. 7, 8a, and 8b. The user can change the ratio by actuating an operating element, which is arranged on, for example, the handlebars of the bicycle. This operating element is, for example, connected by means of at least one pull cable 134 to the cable pull carrier 132. The cable pull carrier 132 is positively connected in turn to the carrier 82 of the adjusting device 80. By means of the operating element and the pull cable 134, the user causes an adjusting movement to occur at the cable pull carrier 132.

In the exemplary embodiment according to FIG. 9 and in agreement with FIGS. 7 and 8, the rotational adjusting movement is transferred to an end section 50 of the planetary rolling elements 40 by means of the joint heads 88, the arms 84, the roller bearings 90, and the shoes 86. The shoes 86 are displaced in essentially the radial direction in receptacles between the two adjacent sections 102a and 102b or 104a and 104b of the guide element 100. The planetary rolling elements 40 are then displaced by the guidance of the contact points 12, 22, 32 in such a way that the center M of the planetary rolling elements 40 describes a circular path K. In this way, the effective radii W1 and W2 between the first transmission element 10 and the second transmission element 20 and the longitudinal axis 42 of the planetary rolling elements 40 are changed, and thus the transmission ratio of the transmission is changed accordingly.

The embodiment of the planetary transmission 1 according to the invention as shown in FIG. 10 differs from the one in FIG. 9 essentially in the execution of the adjusting device 80 and, correspondingly, in the transfer of the adjusting movement from the cable pull carrier 132 to at least one end section 48, 50 of the planetary rolling elements 40. The details of the transmission 1 which can already be derived from the description of FIG. 9 will therefore not be discussed again.

In this embodiment, the transmission ratio is adjusted by the axial displacement of the guide element 100 relative to the first and second transmission elements 10, 20 and the support element 30. At least one end section 50, and preferably both end sections 48, 50, of the planetary rolling elements 40 are supported in the guide element 100. For this purpose, appropriate travel elements 92 are provided, in which the end sections 48, 50 of the planetary rolling elements 40 are accommodated. The travel elements 92 can be configured as roller bearings, for example. The travel elements 92 are mounted in receptacles 110 in the guide element 100 oriented essentially in the radial direction. In addition, the travel elements 92 are positively connected to shoulders 112 of the guide element 100 and support the planetary rolling elements 40 in the axial direction on that element. In this way, an axial displacement of the guide element 100 brings about an axial displacement of the planetary rolling elements 40, whereas the displacement of the end sections 48, 50 in the radial receptacles 110 of the guide element 100 can proceed with essentially no difficulty. The planetary rolling elements 40 can therefore be guided by the contact points 12, 22, 32, so that the center M of the planetary rolling elements 40 describes a circular path K. In this way, the effective radii W1 and W2 between the first and second transmission elements 10 and 20 and the longitudinal axis 42 of the planetary rolling elements 40 and thus, correspondingly, the transmission ratio of the transmission 1, are changed.

The rotational adjusting movement of the cable pull carrier 132 is transferred or converted to an axial displacement of the guide element 100 by means of the carrier 82 and a pin 114. The pin 114 is cylindrical and is arranged radially with respect to the transmission axis 2. One end of the pin 114 is held in the guide element 100 and thus connected positively or non-positively to it. The pin 114 projects out from the guide element 100 toward the transmission axis 2. The end of the pin 114 which projects from the guide element 100 is accommodated in a groove 116, which is in the form of a spiral passing around the carrier 82. The carrier 82 is fixed axially therein on the gear shaft 4. The rotational adjusting movement of the cable pull carrier 132 brings about a relative rotational movement of the carrier 82 connected to it around the transmission axis 2. The rotational movement of the carrier 82 thus causes the pin 114 to shift axially in the spiral groove 116. The axial displacement of the pin 114 is accompanied by an axial displacement of the guide element 100.

So that the guide element 100 can be axially displaced, it can be supported on the gear shaft 4 by means of, for example, a ball guide 118. In addition to the ball guide 118 shown in FIG. 10 by way of example, the skilled person will see that there are alternative support possibilities for the guide element 100 by means of which the previously described displacement of the guide element 100 can be implemented.

In alternative embodiments, it is also conceivable that the guide element 100 could be axially displaced in an active manner by external means, e.g., by a threaded connection, a hydraulic cylinder, or a servomotor.

The exemplary embodiments shown here are to be considered two of many alternatives for the use of the planetary transmission according to the invention. In no way should the exemplary embodiments shown be held to limit the scope of protection in any way. By means of appropriate adaptation of the dimensions and/or of the combination of the transmission with a drive and a take-off, the planetary transmission according to the invention can be used in many different areas of application. For example, the first transmission element or friction ring can be arranged non-rotatably on the transmission axis, and the torque can be introduced by way of the support element and taken off by way of the second transmission element. Thus the skilled person is given numerous possibilities for the use of the continuously-variable planetary transmission according to the invention.

The invention claimed is:

1. A continuously-variable planetary transmission comprising:
   first and second rotatable transmission elements spaced at a fixed axial distance from one another around a transmission axis, the first transmission element having at least one first contact point and the second transmission element having at least one second contact point;
   at least one support element in substantially fixed radial position with respect to the transmission axis and in substantially fixed axial position with respect to the transmission elements, each support element having at least one third contact point;
   at least one elongated planetary rolling element rotationally symmetric around its longitudinal axis and rotatable therearound, each rolling element:
   contacting the transmission elements at the first and second contact points, respectively, and each support element at its third contact point, the contact points each in frictional rolling connection to the least one rolling element, and
   being supported by the first and second transmission elements and the at least one support element with freedom to move around the transmission axis; and
   an adjusting device for displacing the center of each of the at least one planetary rolling element to cause a change in the ratio of the planetary transmission.

2. The continuously-variable planetary transmission of claim 1 wherein the first transmission element, the second transmission element, and the at least one support element guide the at least one planetary rolling element so that during the displacement of its center by the adjusting device, such center moves along a circular path.

3. The continuously-variable planetary transmission of claim 1 wherein each of the planetary rolling elements includes opposite end sections and two side sections adjacent thereto in the longitudinal direction, the surfaces of the side sections being convexly curved in the longitudinal direction so that each side section tapers down toward the end section adjacent thereto.

4. The continuously-variable planetary transmission of claim 3 wherein each of the convex curvatures of the surfaces of the two side sections has a constant radius in the longitudinal direction.

5. The continuously-variable planetary transmission of claim 1 wherein each planetary rolling element includes a circumferential recess between its side sections.

6. The continuous-variable planetary transmission of claim 5 wherein the surface of the circumferential recess is concave in the longitudinal direction, and this concavity has a constant radius in the longitudinal direction.

7. The continuously-variable planetary transmission of claim 6 wherein the at least one support element has exactly one third contact point, such third contact point lying on an axis of symmetry perpendicular to and intersecting the transmission axis, and wherein the at least one first contact point and the at least one second contact point are symmetrically arranged with respect to the axis of symmetry, the first, second, and third contact points forming three-point support for a planetary rolling element.

8. The continuously-variable planetary transmission of claim 5 wherein the circumferential recess has a V-shaped cross-section.

9. The continuously-variable planetary transmission of claim 5 wherein an outer surface of the at least one support element is convexly curved with a constant radius in the axial direction of the transmission axis.

10. The continuously-variable planetary transmission of claim 1 wherein each support element includes two third contact points such that the first, second, and two third contact points form four-point support for a planetary rolling element.

11. The continuously-variable planetary transmission of claim 1 wherein each support element consists of multiple parts.

12. The continuously-variable planetary transmission of claim 1 further including first and second torque-dependent pressing devices, the pressing devices being connected to the first and second transmission elements, respectively, causing the transmission elements to be pressed against the at least one planetary rolling element.

13. The continuously-variable planetary transmission of claim 1 wherein the adjusting device acts on at least one end section of each planetary rolling element.

14. The continuously-variable planetary transmission of claim 1 further including a guide element around the transmission axis, the guide element configured to support the end sections of each planetary rolling element and hold the planetary rolling elements at a defined distance from one another.

15. A continuously-variable planetary transmission comprising:
   first and second rotatable transmission elements spaced at a fixed axial distance from one another around a transmission axis, the first transmission element having at least one first contact point and the second transmission element having at least one second contact point;
   at least one support element in substantially fixed radial position with respect to the transmission axis and in substantially fixed axial position with respect to the transmission elements, each support element having at least one third contact point; and
   at least one elongated planetary rolling element rotationally symmetric around its longitudinal axis and rotatable therearound, each rolling element:
   contacting the transmission elements at the first and second contact points, respectively, and each support element at its third contact point, the contact points each in frictional rolling connection to the least one rolling element;

being supported by the first and second transmission elements and the at least one support element with freedom to move around the transmission axis; and being configured to permit displacement of its center to cause a change in the ratio of the planetary transmission.

16. A method for changing the transmission ratio of a continuously-variable planetary transmission, the method comprising:

producing an adjusting movement at an input of an adjusting device;

using the adjusting device to transfer the adjusting movement to at least one end section of an at least one planetary rolling element; and displacing the center of the at least one planetary rolling element along a circular path as a result of the adjusting movement and thus changing the transmission ratio.

17. The method of claim 16 wherein the transfer of the adjusting movement to an at least one end section of the at least one planetary rolling element comprises axial displacement of a guide element and the at least one end section of the at least one planetary rolling element is supported in the guide element.

* * * * *